United States Patent
Yukawa

(10) Patent No.: US 9,493,040 B2
(45) Date of Patent: Nov. 15, 2016

(54) PNEUMATIC TIRE

(75) Inventor: Naoki Yukawa, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 222 days.

(21) Appl. No.: 14/232,325

(22) PCT Filed: Jul. 26, 2012

(86) PCT No.: PCT/JP2012/068938
§ 371 (c)(1),
(2), (4) Date: Jan. 13, 2014

(87) PCT Pub. No.: WO2013/018644
PCT Pub. Date: Feb. 7, 2013

(65) Prior Publication Data
US 2014/0144565 A1    May 29, 2014

(30) Foreign Application Priority Data
Jul. 29, 2011  (JP) ................................. 2011-166469

(51) Int. Cl.
*B60C 13/00*  (2006.01)
*B60C 13/02*  (2006.01)
*B60C 15/00*  (2006.01)
(Continued)

(52) U.S. Cl.
CPC ........... *B60C 13/02* (2013.01); *B60C 11/0058* (2013.04); *B60C 15/0045* (2013.04); *B60C 17/0009* (2013.04); *B60C 2015/0614* (2013.04)

(58) Field of Classification Search
CPC ....... B60C 13/00; B60C 13/02; B60C 15/00; B60C 15/024
See application file for complete search history.

(56) References Cited

U.S. PATENT DOCUMENTS

| 5,263,525 A | 11/1993 | Yamashita |
|---|---|---|
| 2009/0032161 A1 | 2/2009 | Yamaguchi |

(Continued)

FOREIGN PATENT DOCUMENTS

| EP | 481687 | * 12/1994 |
|---|---|---|
| JP | 6-32121 | * 2/1994 |
| JP | 6-80004 A | 3/1994 |

(Continued)

OTHER PUBLICATIONS

Machine translation of JP 2010-274886, 2010.*

(Continued)

*Primary Examiner* — Justin Fischer
(74) *Attorney, Agent, or Firm* — Birch, Stewart, Kolasch & Birch, LLP

(57) ABSTRACT

[Object] To provide a pneumatic tire 2 which is lightweight and is excellent in durability.
[Solution] A tire 2 has a large number of dimples 62 on sidewalls 8 thereof. These dimples 62 are arranged along a circumferential direction. The contour of each dimple 62 is, for example, a rectangle. In each dimple 62, the length in a circumferential direction is larger than the length in a radial direction. The area occupation ratio of each dimple 62 is equal to or greater than 75% but equal to or less than 93%. The contour of each dimple is symmetrical about a straight line extending in the radial direction. Preferably, the depth of each dimple 62 is equal to or greater than 0.5 mm but equal to or less than 4.0 mm. The width of a land between each dimple 62 and another dimple 62 adjacent to this dimple 62 is preferably equal to or greater than 0.3 mm but equal to or less than 3.0 mm.

18 Claims, 11 Drawing Sheets

(51) Int. Cl.
  *B60C 17/00* (2006.01)
  *B60C 11/00* (2006.01)

(56) References Cited

U.S. PATENT DOCUMENTS

2010/0132866 A1* 6/2010 Imoto .................... C08K 7/06
                                                              152/517
2012/0060994 A1  3/2012 Hayashi et al.

FOREIGN PATENT DOCUMENTS

| JP | 2000-16030 A | | 1/2000 |
|---|---|---|---|
| JP | 2003-118310 | * | 4/2003 |
| JP | 2010-155576 A | | 7/2010 |
| JP | 2010-260376 A | | 11/2010 |
| JP | 2010-274886 A | | 12/2010 |
| JP | 2010-280322 A | | 12/2010 |
| JP | 2011-37372 A | | 2/2011 |
| WO | WO 2007/032405 A1 | | 3/2007 |
| WO | WO 2010/140524 A1 | | 12/2010 |

OTHER PUBLICATIONS

International Search Report, issued in PCT/JP2012/068938, dated Dec. 4, 2012.
Written Opinion of the International Search Authority, issued in PCT/JP2012/068938, dated Dec. 4, 2012.

* cited by examiner

PNEUMATIC TIRE

TECHNICAL FIELD

The present invention relates to pneumatic tires. Specifically, the present invention relates to improvement of side surfaces of tires.

BACKGROUND ART

In recent years, run flat tires including load support layers inside sidewalls have been developed and widespread. Highly hard crosslinked rubber is used for the support layers. Such run flat tires are called a side reinforcing type. In this type of a run flat tire, if the internal pressure is reduced due to puncture, a load is supported by the support layers. The support layers suppress flexure of the tire in a punctured state. Even if running is continued in the punctured state, the highly hard crosslinked rubber suppresses heat generation in the support layers. This run flat tire allows for running for some distance even in the punctured state. An automobile having such run flat tires mounted thereon need not be always equipped with a spare tire. The use of this run flat tire avoids change of a tire in an inconvenient place.

When running with the run flat tire in a punctured state is continued, deformation and restoration of the support layers are repeated. Due to the repetition, heat is generated in the support layers, and the temperature of the tire reaches a high temperature. The heat causes breakage of rubber components of the tire and separation among the rubber components of the tire. It is impossible to run with the tire in which the breakage and the separation have occurred. Run flat tires are desired which allow for running for a long period of time in a punctured state. In other words, run flat tires are desired which are less likely to cause breakage and separation due to heat.

JP2010-274886 discloses a run flat tire having a large number of dimples on sidewalls thereof. In the tire, turbulent flow is generated by the dimples. The turbulent flow promotes release of heat from the tire to the atmosphere. In the tire, the temperature is less likely to rise.

WO2007/032405 discloses a run flat tire having a large number of fins on sidewalls thereof. In the tire, turbulent flow is generated by the fins. The turbulent flow promotes release of heat from the tire to the atmosphere. In the tire, the temperature is less likely to rise.

CITATION LIST

Patent Literature

Patent Literature 1: JP2010-274886
Patent Literature 2: WO2007/032405

SUMMARY OF THE INVENTION

Problems to be Solved by the Invention

Each sidewall of the tire described in JP2010-274886 has dimples and a land. At the land, the thickness of the sidewall is large. The weight of the tire having the land is high. In terms of fuel consumption, there is room for improvement of the tire.

In the tire disclosed in WO2007/032405, the fins easily wear away. In the tire in which the fins have worn away, heat release is less likely to occur.

Similarly to run flat tires, for general pneumatic tires, promotion of heat release is also desired.

An object of the present invention is to provide a pneumatic tire which is lightweight and is excellent in durability.

Solution to the Problems

A pneumatic tire according to the present invention includes, on side surfaces thereof, a large number of dimples arranged along a circumferential direction and a land which is a part other than the dimples. In a contour of each dimple, a length in the circumferential direction is larger than a length in a radial direction. An area occupation ratio of each dimple is equal to or greater than 75% but equal to or less than 93%.

Preferably, the contour of each dimple is symmetrical about a straight line extending in the radial direction.

Preferably, a depth of each dimple is equal to or greater than 0.5 mm but equal to or less than 4.0 mm.

Preferably, the contour of each dimple is substantially a quadrilateral. Each corner of the quadrilateral is rounded. A curvature radius R2 of the rounded corner is equal to or greater than 0.5 mm but equal to or less than 3.0 mm.

The contour of each dimple may be substantially a parallelogram. Preferably, each long side of the parallelogram extends in the circumferential direction. An angle of each short side of the parallelogram relative to the radial direction is equal to or less than 20°.

Each dimple can have a side surface connected to the land and a bottom surface connected to the side surface. Preferably, a corner between the side surface and the bottom surface is rounded. A curvature radius R1 of the rounded corner is equal to or greater than 0.5 mm but equal to or less than 2.0 mm. The side surface may be a slope tilted relative to a depth direction of the dimple.

Preferably, a width of the land between each dimple and another dimple adjacent to the each dimple is equal to or greater than 0.3 mm but equal to or less than 3.0 mm.

Preferably, the tire includes dimples of a first row which are aligned along the circumferential direction and dimples of a second row which are aligned along the circumferential direction and are adjacent to the dimples, respectively, of the first row. The dimples of the first row and the dimples of the second row are arranged in a zigzag manner. Preferably, a distance in the circumferential direction between a position of each dimple which belongs to the first row and a position of the dimple which is adjacent to the each dimple and belongs to the second row is equal to or greater than 3.0 mm.

Preferably, each dimple has a plurality of ridges on a bottom surface thereof.

Preferably, a pitch in the circumferential direction between the dimples is equal to or greater than 5 mm but equal to or less than 60 mm. Preferably, a pitch in the radial direction between the dimples is equal to or greater than 2 mm but equal to or less than 40 mm.

Each dimple exerts significant effects in the tire including:
(1) a tread having an outer surface which forms a tread surface;
(2) a pair of sidewalls extending from ends, respectively, of the tread substantially inward in the radial direction;
(3) a pair of beads located substantially inward of the sidewalls, respectively, in the radial direction;
(4) a carcass extending along the tread and the sidewalls and on and between the beads; and
(5) a pair of load support layers located inward of the sidewalls, respectively, in the axial direction.

Each bead can include a core and an apex extending from the core outward in the radial direction. Preferably, in the radial direction, positions of the dimples coincide with a position of an outer end, in the radial direction, of the apex. In the radial direction, the positions of the dimples may coincide with a position where a thickness of each load support layer is at its maximum.

The tire can include a pair of clinch portions located substantially inward of the sidewalls in the radial direction. Preferably, in the radial direction, positions of the dimples coincide with a position of an outer end, in the radial direction, of each clinch portion. In the radial direction, the positions of the dimples may coincide with a position of a portion of each sidewall where a curvature radius of the sidewall is the smallest during running in a punctured state.

Preferably, a thermal conductivity of each sidewall is equal to or greater than 0.1 W/m/K. Preferably, a thermal conductivity of each load support layer is equal to or greater than 0.2 W/m/K.

Advantageous Effects of the Invention

The pneumatic tire according to the present invention is lightweight and is excellent in heat release performance. In this tire, the land is less likely to wear away. The tire is also excellent in durability.

DESCRIPTION OF EMBODIMENTS

The following will describe in detail the present invention based on preferred embodiments with appropriate reference to the drawings.

Figure 1:
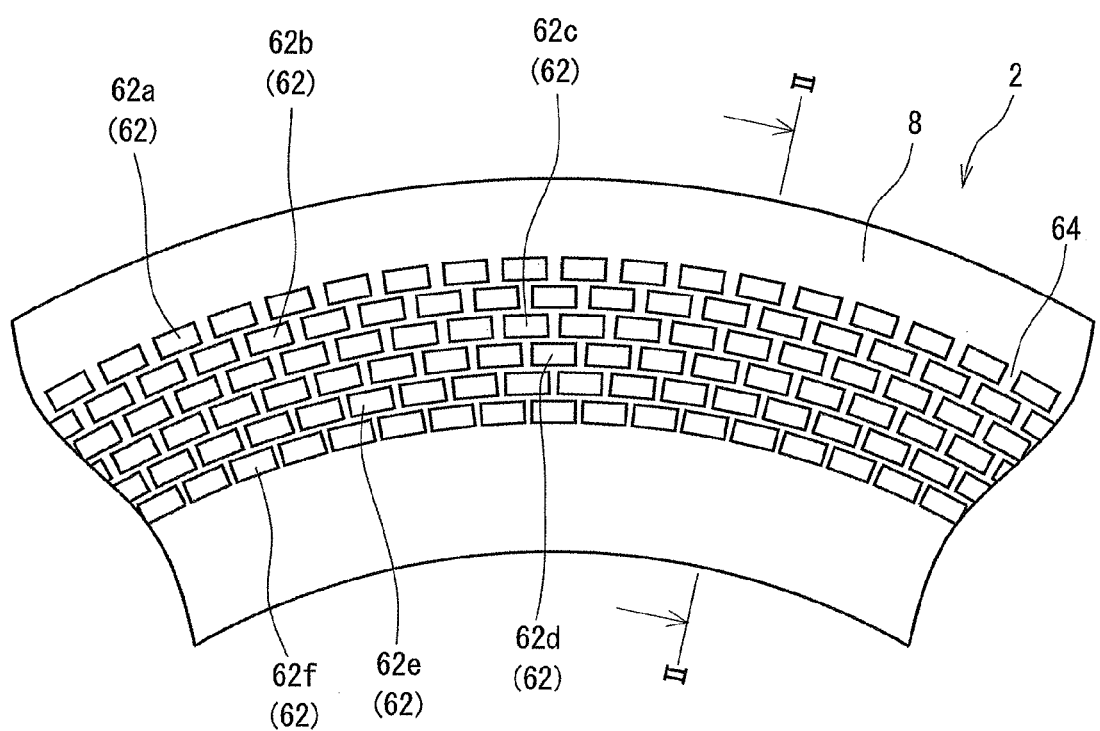
FIG. 1 is a front view showing a portion of a pneumatic tire according to one embodiment of the present invention.
Figure 2:
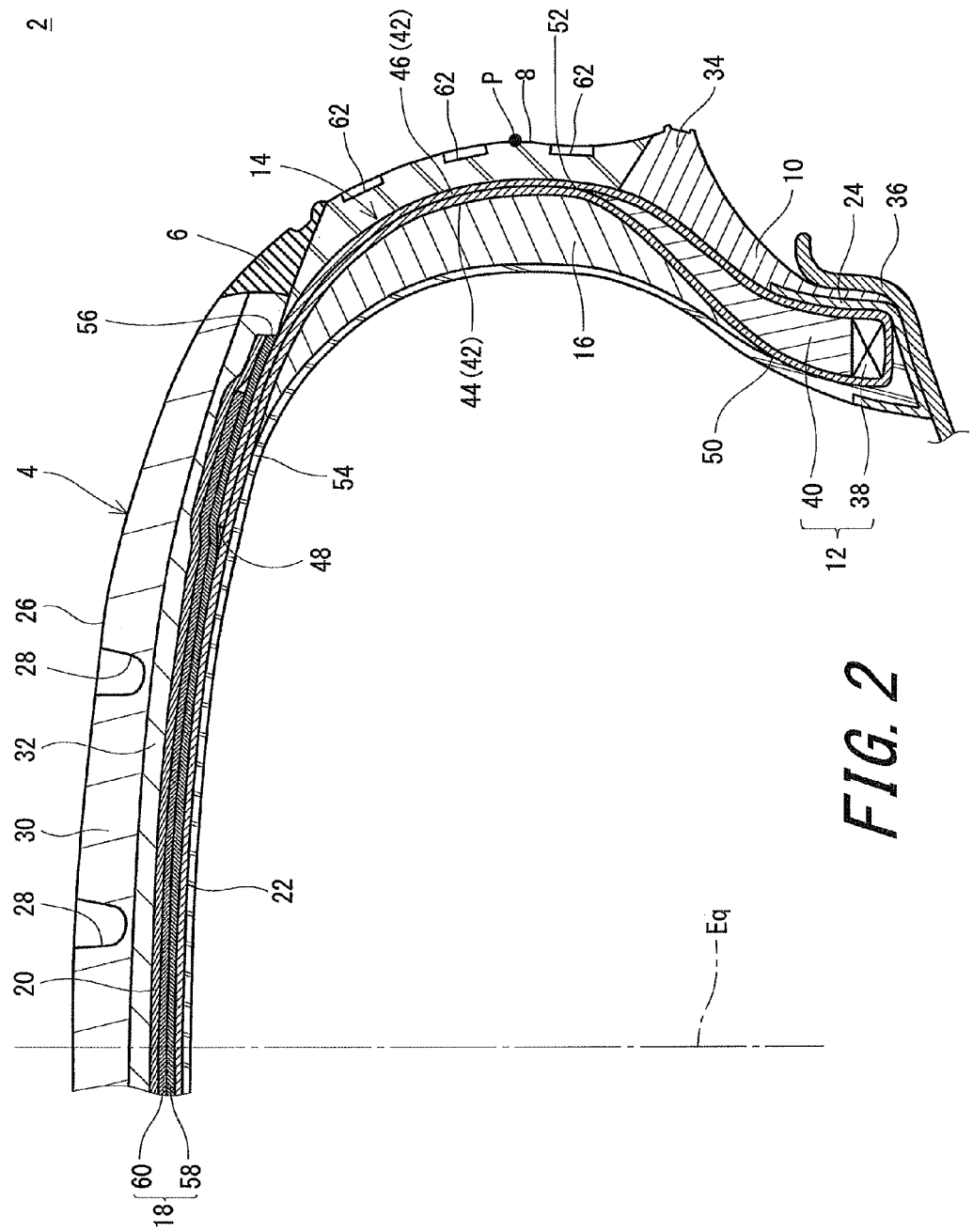
FIG. 2 is an enlarged cross-sectional view of the tire in FIG. 1, taken along a line II-II.

FIGS. 1 and 2 show a run flat tire 2. In FIG. 2, the up-down direction is the radial direction of the tire 2, the right-left direction is the axial direction of the tire 2, and the direction perpendicular to the surface of the sheet is the circumferential direction of the tire 2. In FIG. 2, an alternate long and short dash line Eq represents the equator plane of the tire 2.

The tire 2 includes a tread 4, wings 6, sidewalls 8, clinch portions 10, beads 12, a carcass 14, load support layers 16, a belt 18, a band 20, an inner liner 22, and chafers 24. The belt 18 and the band 20 form a reinforcing layer. The reinforcing layer may be composed of the belt 18 only. The reinforcing layer may be composed of the band 20 only.

The tread 4 has a shape projecting outward in the radial direction. The tread 4 forms a tread surface 26 which is brought into contact with a road surface. Grooves 28 are formed on the tread surface 26. A tread pattern is formed by the grooves 28. The tread 4 includes a cap layer 30 and a base layer 32. The cap layer 30 is formed from a crosslinked rubber. The base layer 32 is formed from another crosslinked rubber. The cap layer 30 is located outward of the base layer 32 in the radial direction. The cap layer 30 is laminated on the base layer 32.

The sidewalls 8 extend from the ends of the tread 4 substantially inward in the radial direction. The sidewalls 8 are formed from a crosslinked rubber. The sidewalls 8 prevent injury of the carcass 14. The sidewalls 8 include ribs 34. The ribs 34 project outward in the axial direction. During running in a punctured state, the ribs 34 abut against flanges 36 of a rim. The abutment allows deformation of the beads 12 to be suppressed. The tire 2 in which the deformation is suppressed is excellent in durability in a punctured state.

The thermal conductivity of each sidewall 8 is preferably equal to or greater than 0.1 W/m/K. During running in a punctured state, heat is sufficiently released from the sidewall 8. In light of heat release, the thermal conductivity is more preferably equal to or greater than 0.2 W/m/K. By dispersing fibers having an excellent thermally conductive property in the rubber of the sidewall 8, a high thermal conductivity can be achieved.

The clinch portions 10 are located substantially inward of the sidewalls 8 in the radial direction. The clinch portions 10 are located outward of the beads 12 and the carcass 14 in the axial direction. The clinch portions 10 abut against the flanges 36 of the rim.

The beads 12 are located inward of the sidewalls 8 in the radial direction. Each bead 12 includes a core 38 and an apex 40 extending from the core 38 outward in the radial direction. The core 38 has a ring shape and includes a non-stretchable wound wire (typically, a steel wire). The apex 40 is tapered outward in the radial direction. The apex 40 is formed from a highly hard crosslinked rubber.

The carcass 14 is formed of a carcass ply 42. The carcass ply 42 extends on and between the beads 12 on both sides, and extends along the tread 4 and the sidewalls 8. The carcass ply 42 is turned up around each core 38 from the inner side to the outer side in the axial direction. Due to this turning-up, a main portion 44 and turned-up portions 46 are formed in the carcass ply 42. Ends 48 of the turned-up portions 46 are located immediately below the belt 18. In other words, each turned-up portion 46 overlaps the belt 18. The carcass 14 has a so-called "ultra-highly turned-up structure". The carcass 14 having the ultra-highly turned-up structure contributes to durability of the tire 2 in a punctured state. The carcass 14 contributes to durability in a punctured state.

The carcass ply 42 includes a large number of cords aligned with each other, and a topping rubber, which are not shown. The absolute value of the angle of each cord relative to the equator plane is 45° to 90° and more preferably 75° to 90°. In other words, the carcass 14 has a radial structure.

The cords are formed from an organic fiber. Examples of preferable organic fibers include polyester fibers, nylon fibers, rayon fibers, polyethylene naphthalate fibers, and aramid fibers.

The load support layers 16 are located inward of the sidewalls 8 in the axial direction. Each support layer 16 is interposed between the carcass 14 and the inner liner 22. The support layers 16 are tapered inward and outward in the radial direction. Each support layer 16 has a crescent-like shape. The support layers 16 are formed from a highly hard crosslinked rubber. When the tire 2 is punctured, the support layers 16 support a load. The support layers 16 allow for running for some distance with the tire 2 even in a punctured state. The run flat tire 2 is of a side reinforcing type. The tire 2 may include support layers each having a shape different from the shape of the support layer 16 shown in FIG. 2. A point P shown in FIG. 2 is the intersection of the surface of the sidewall 8 and a straight line that extends in the axial direction and passes through a position where the width of the support layer 16 is at its maximum.

Portions of the carcass 14 which overlap the support layers 16 are separated from the inner liner 22. In other words, the carcass 14 is bent due to the presence of the support layers 16. In a punctured state, a compressive load is applied to the support layers 16, and a tensile load is applied to regions of the carcass 14 which are near the support layers 16. Each support layer 16 is a lump of rubber and can sufficiently bear the compressive load. The cords of the carcass 14 can sufficiently bear the tensile load. The support layers 16 and the carcass cords suppress vertical flexure of the tire 2 in the punctured state. The tire 2 of which vertical flexure is suppressed is excellent in handling stability in a punctured state.

In light of suppression of vertical distortion in a punctured state, the hardness of each support layer 16 is preferably equal to or greater than 60 and more preferably equal to or greater than 65. In light of ride comfort in a normal state, the hardness is preferably equal to or less than 90 and more preferably equal to or less than 80. The hardness is measured according to the standard of "JIS K6253" with a type A durometer. The hardness is measured by pressing the durometer against the cross section shown in FIG. 2. The measurement is performed at a temperature of 23° C.

Lower ends 50 of the support layers 16 are located inward of upper ends 52 of the apexes 40 (i.e., outer ends, in the radial direction, of the beads) in the radial direction. In other words, the support layers 16 overlap the apexes 40. The distance in the radial direction between the lower end 50 of each support layer 16 and the upper end 52 of the corresponding apex 40 is preferably equal to or greater than 5 mm and preferably equal to or less than 50 mm. In the tire 2 in which the distance is within this range, a uniform stiffness distribution is obtained. The distance is more preferably equal to or greater than 10 mm. The distance is more preferably equal to or less than 40 mm.

Upper ends 54 of the support layers 16 are located inward of ends 56 of the belt 18 in the axial direction. In other words, the support layers 16 overlap the belt 18. The distance in the axial direction between the upper end 54 of each support layer 16 and the corresponding end 56 of the belt 18 is preferably equal to or greater than 2 mm and preferably equal to or less than 50 mm. In the tire 2 in which the distance is within this range, a uniform stiffness distribution is obtained. The distance is more preferably equal to or greater than 5 mm. The distance is more preferably equal to or less than 40 mm.

In light of suppression of vertical distortion in a punctured state, the maximum thickness of each support layer 16 is preferably equal to or greater than 3 mm, more preferably equal to or greater than 4 mm, and particularly preferably equal to or greater than 7 mm. In light of reduction in the weight of the tire 2, the maximum thickness is preferably equal to or less than 25 mm and more preferably equal to or less than 20 mm.

The thermal conductivity of each support layer 16 is preferably equal to or greater than 0.2 W/m/K. During running in a punctured state, heat is conducted from each support layer 16 to another component. In light of conduction, the thermal conductivity is more preferably equal to or greater than 0.3 W/m/K. By dispersing fibers having an excellent thermally conductive property in the rubber of each support layer 16, a high thermal conductivity can be achieved.

The belt 18 is located outward of the carcass 14 in the radial direction. The belt 18 is laminated on the carcass 14. The belt 18 reinforces the carcass 14. The belt 18 includes an inner layer 58 and an outer layer 60. As is obvious from FIG. 1, the width of the inner layer 58 is slightly greater than the width of the outer layer 60. Each of the inner layer 58 and the outer layer 60 includes a large number of cords aligned with each other, and a topping rubber, which are not shown. Each cord is tilted relative to the equator plane. Normally, the absolute value of the tilt angle is equal to or greater than 10° but equal to or less than 35°. The direction in which each cord of the inner layer 58 is tilted relative to the equator plane is opposite to the direction in which each cord of the outer layer 60 is tilted relative to the equator plane. The material of the cords is preferably steel. An organic fiber may be used for the cords. The belt 18 may include three or more layers.

The band 20 covers the belt 18. The band 20 includes a cord and a topping rubber, which are not shown. The cord is helically wound. The band 20 has a so-called jointless structure. The cord extends substantially in the circumferential direction. The angle of the cord relative to the circumferential direction is equal to or less than 5° and further equal to or less than 2°. The belt 18 is secured by the cord, so that lifting of the belt 18 is suppressed. The cord is formed from an organic fiber. Examples of preferable organic fibers include nylon fibers, polyester fibers, rayon fibers, polyethylene naphthalate fibers, and aramid fibers.

The tire 2 may include, instead of the band 20, so-called edge bands which cover only the vicinities of the ends 56 of the belt 18. The tire 2 may include both the band 20 and the edge bands.

The inner liner 22 is bonded to the inner peripheral surface of the carcass 14. The inner liner 22 is formed from a crosslinked rubber. A rubber that has an excellent air blocking property is used for the inner liner 22. The inner liner 22 maintains the internal pressure of the tire 2.

As shown in FIGS. 1 and 2, the tire 2 has a large number of dimples 62 on the side surfaces thereof. In the present invention, the side surfaces mean regions of the outer surfaces of the tire 2 that can be viewed in the axial direction. Typically, the dimples 62 are formed on the surfaces of the sidewalls 8. Of each side surface, a part other than the dimples 62 is a land.

Figure 3:
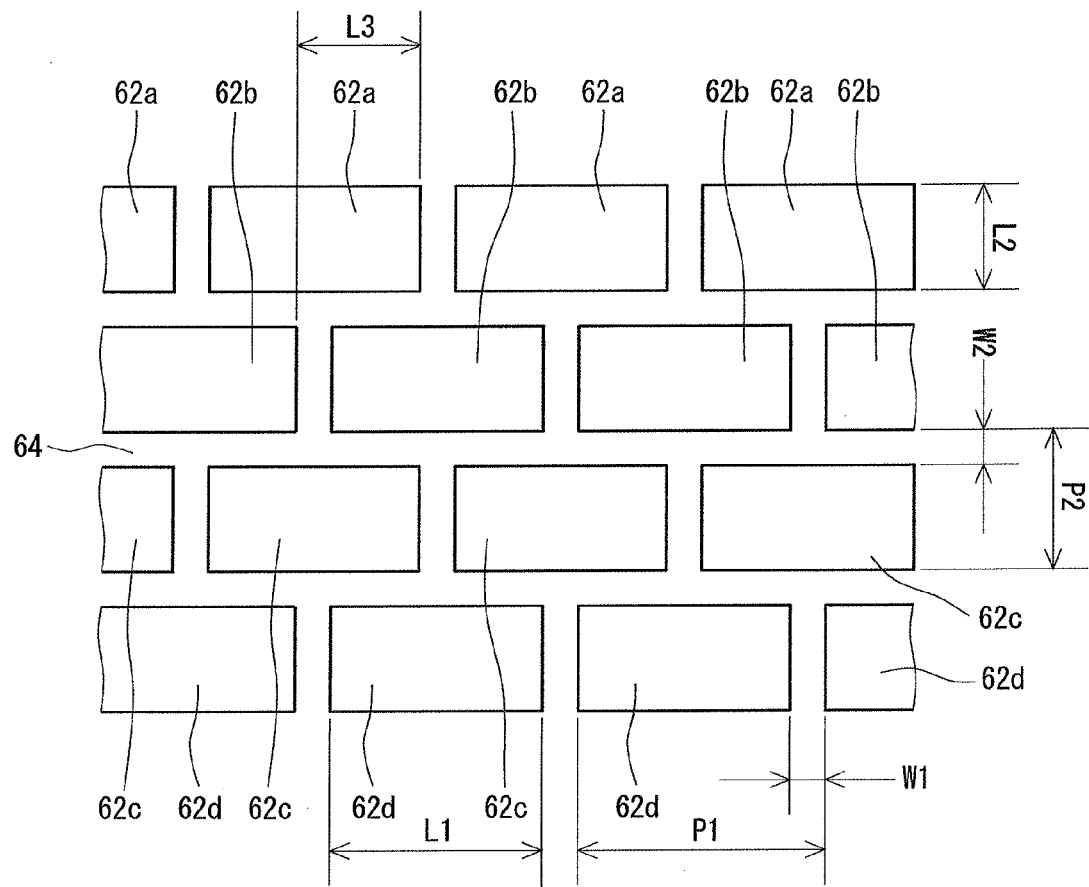
FIG. 3 is an enlarged front view showing a portion of a sidewall of the tire in FIG. 2.

FIG. 3 is an enlarged front view showing a portion of the sidewall 8 of the tire in FIG. 2. In FIG. 3, the right-left direction is the circumferential direction, and the up-down direction is the radial direction. FIG. 3 shows a large number of the dimples 62. The contour of each of the dimples 62 is a rectangle. In other words, in each dimple 62, the length in the circumferential direction is larger than the length in the radial direction. Similar dimples 62 may also be formed on the clinch portions 10.

During running of a vehicle, turbulent flow is generated by the dimples 62. The turbulent flow promotes release of heat from the sidewalls 8. At the dimples 62 which are longer in the circumferential direction than in the radial direction, turbulent flow easily continues. In the tire 2, the temperature is less likely to rise even in a punctured state. The tire 2 is excellent in durability in a punctured state.

In FIG. 3, an arrow L indicates the length of the long side of the dimple 62. The length L1 is the length, in the circumferential direction, of the dimple 62. In light of easy continuation of turbulent flow and in light of reduction in the weight of the tire 2, the length L1 is preferably equal to or greater than 4 mm and particularly preferably equal to or greater than 10 mm. From the standpoint that turbulent flow is generated at a large number of locations, the length L1 is preferably equal to or less than 55 mm. In FIG. 3, an arrow L2 indicates the length of the short side of the dimple 62. The length L2 is the length, in the radial direction, of the dimple 62. In light of reduction in the weight of the tire 2, the length L2 is preferably equal to or greater than 2 mm and particularly preferably equal to or greater than 5 mm. From the standpoint that turbulent flow is generated at a large number of locations, the length L2 is preferably equal to or less than 35 mm.

The contour of each dimple 62 is symmetrical about a straight line extending in the radial direction. The heat release effect by the dimple does not depend on a rotating direction.

FIG. 3 shows dimples 62a of a first row, dimples 62b of a second row, dimples 62c of a third row, and dimples 62d of a fourth row. The tire 2 also has dimples 62e of a fifth row and dimples 62f of a sixth row (see FIG. 1), which are not shown in FIG. 3. The dimples 62a of the first row are aligned along the circumferential direction. The dimples 62b of the second row are aligned along the circumferential direction. The dimples 62c of the third row are aligned along the circumferential direction. The dimples 62d of the fourth row are aligned along the circumferential direction. The dimples 62e of the fifth row are aligned along the circumferential direction. The dimples 62f of the sixth row are aligned along the circumferential direction. In this embodiment, the number of the rows is 6. The number of the rows is preferably equal to or greater than 2. The use of the dimples 62 in which the length L2 in the radial direction is smaller than the length L1 in the circumferential direction allows the number of the rows to be equal to or greater than 2. The number of the rows is preferably equal to or less than 6 and particularly preferably equal to or less than 4.

As is obvious from FIG. 1, the dimples 62a of the first row and the dimples 62b of the second row are arranged in a zigzag manner. In the sidewall 8, locations where turbulent flow is generated are not unevenly distributed. Similarly, the dimples 62b of the second row and the dimples 62c of the third row are arranged in a zigzag manner; the dimples 62c of the third row and the dimples 62d of the fourth row are arranged in a zigzag manner; the dimples 62d of the fourth row and the dimples 62e of the fifth row are arranged in a zigzag manner; and the dimples 62e of the fifth row and the dimples 62f of the sixth row are arranged in a zigzag manner. In the tire 2, release of heat from the sidewalls 8 is promoted.

In FIG. 3, an arrow L3 indicates the distance in the circumferential direction between the position of the dimple 62a belonging to the first row and the position of the dimple 62b belonging to the second row. From the standpoint that locations where turbulent flow is generated are not unevenly distributed, the distance L3 is preferably equal to or greater than 3.0 mm and particularly preferably equal to or greater than 7.0 mm. The distance in the circumferential direction between the dimple 62b of the second row and the dimple 62c of the third row, the distance in the circumferential direction between the dimple 62c of the third row and the dimple 62d of the fourth row, the distance in the circumferential direction between the dimple 62d of the fourth row and the dimple 62e of the fifth row, and the distance in the circumferential direction between the dimple 62e of the fifth row and the dimple 62f of the sixth row are also preferably within the above range.

In FIG. 3, an arrow P1 indicates the pitch in the circumferential direction between the dimples 62. From the standpoint that dimples 62 having a large length L1 can be formed, the pitch P1 is preferably equal to or greater than 5 mm and particularly preferably equal to or greater than 12 mm. From the standpoint that turbulent flow is generated at a large number of locations, the pitch P1 is preferably equal to or less than 60 mm. In FIG. 3, an arrow P2 indicates the pitch in the radial direction between the dimples 62. From the standpoint that dimples 62 having a large length L2 can be formed, the pitch P2 is preferably equal to or greater than 2 mm and particularly preferably equal to or greater than 6 mm. From the standpoint that turbulent flow is generated at a large number of locations, the pitch P2 is preferably equal to or less than 40 mm.

In FIG. 3, an arrow W1 indicates a width of the land 64 in the circumferential direction, and an arrow W2 indicates a width of the land 64 in the radial direction. From the standpoint that the land 64 is less likely to wear away, the widths W1 and W2 are preferably equal to or greater than 0.3 mm and particularly preferably equal to or greater than 1 mm. In light of reduction in the weight of the tire 2, the widths W1 and W2 are preferably equal to or less than 3 mm and particularly preferably equal to or less than 2 mm.

In the present invention, the term "area occupation ratio" means the ratio of the area of the contour of the dimple 62 to a reference area. The reference area is the area of a rectangle in which each long side has the same length as the pitch P1 in the circumferential direction and each short side has the same length as the pitch P2 in the radial direction. When the number of the rows of the dimples is 1, a value obtained by adding 0.5 mm to the length L2 is conveniently regarded as the pitch P2. In light of reduction in the weight of the tire 2, the area occupation ratio is preferably equal to or greater than 75% and particularly preferably equal to or greater than 79%. The tire 2 which is lightweight is excellent in fuel economy, handling performance, and ride comfort performance. From the standpoint that the land 64 is less likely to wear away, the area occupation ratio is preferably equal to or less than 93% and particularly preferably equal to or less than 92%.

Figure 4:
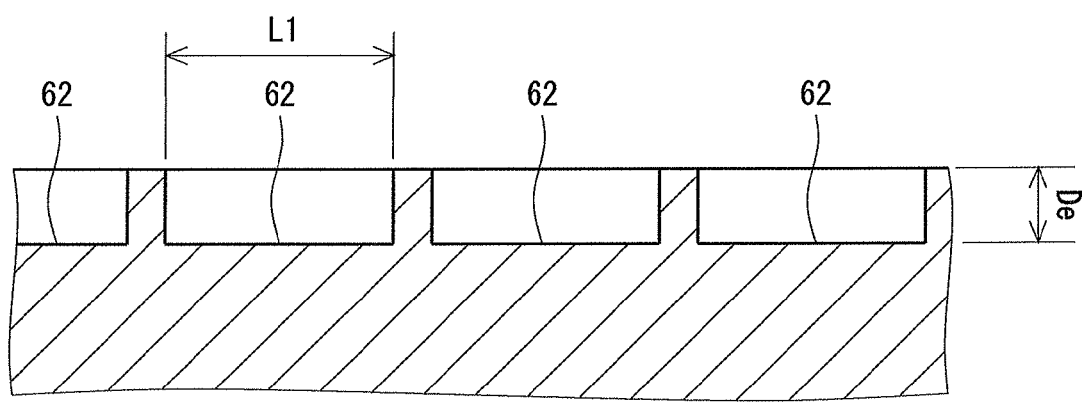
FIG. 4 is a cross-sectional view showing a portion of the tire in FIG. 2.

FIG. 4 is a cross-sectional view showing a portion of the tire in FIG. 2. In FIG. 4, the right-left direction is the circumferential direction, and the up-down direction is the axial direction. In FIG. 4, an arrow De indicates the depth of the dimple 62. From the standpoint that turbulent flow is easily generated, the depth De is preferably equal to or greater than 0.5 mm and particularly preferably equal to or greater than 1.0 mm. In light of reduction in the weight of the tire 2, the depth De is preferably equal to or less than 4.0 mm and particularly preferably equal to or less than 3.0 mm.

Figure 5:
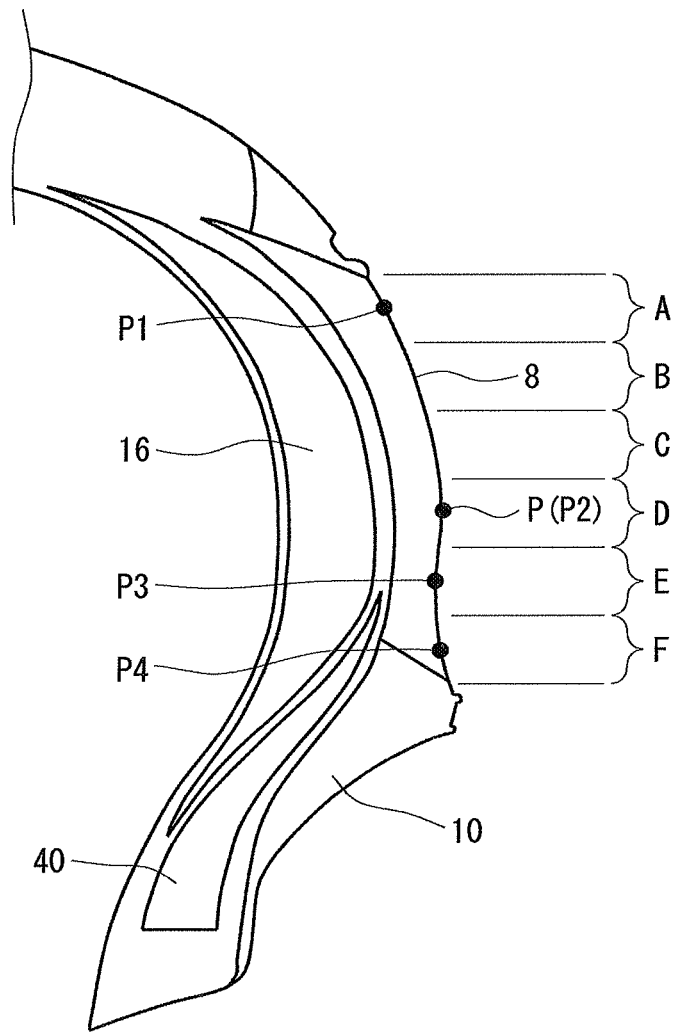
FIG. 5 is a cross-sectional view showing a portion of the tire in FIG. 2.

In FIG. 5, the positions in the radial direction where the dimples 62 are provided are indicated by reference signs A to F. The position indicated by the reference sign A is near a buttress. The position indicated by the reference sign D is the position where the thickness of the load support layer 16 is at its maximum. The position indicated by the reference sign E is the position of the outer end, in the radial direction, of the apex 40. The position indicated by the reference sign F is the position of the outer end, in the radial direction, of the clinch portion 10. The positions of the dimples 62 can be determined as appropriate in accordance with the size, use, or the like of the tire.

Examples of preferable positions, in the radial direction, of the dimples 62 of the run flat tire 2 include:

(1) the position of the outer end, in the radial direction, of the apex 40, (2) the position where the thickness of the load support layer 16 is at its maximum, (3) the position of the outer end, in the radial direction, of the clinch portion 10, and (4) the position of a portion of the sidewall 8 where the curvature radius of the sidewall 8 is the smallest during running in a punctured state.

During running in a punctured state, stress is concentrated on the outer end, in the radial direction, of each apex 40. When the position of this outer end in the radial direction coincides with the positions, in the radial direction, of the dimples 62, separation among the rubber components near the outer end, in the radial direction, of each apex 40 is suppressed.

During running in a punctured state, an amount of generated heat is large at the position where the thickness of each load support layer 16 is at its maximum. When this position coincides with the positions, in the radial direction, of the dimples 62, separation among the rubber components near the position where the thickness of each load support layer 16 is at its maximum, is suppressed.

During running in a punctured state, stress is concentrated on the outer end, in the radial direction, of each clinch portion 10. When the position of this outer end in the radial direction coincides with the positions, in the radial direction, of the dimples 62, separation among the rubber components near the outer end, in the radial direction, of each clinch portion 10 is suppressed.

During running in a punctured state, stress is concentrated on the portion of each sidewall 8 where the curvature radius of the sidewall 8 is the smallest. When the position of this portion coincides with the positions, in the radial direction, of the dimples 62, separation among the rubber components near this portion is suppressed. An example of the portion where the curvature radius is the smallest is a portion near the buttress.

For convenience of marking or the like, a part of locations where the dimples 62 should be formed may be a land. At this part, the dimples 62 are eliminated. The elimination rate is preferably equal to or less than 20% and particularly preferably equal to or less than 10%.

In addition to the run flat tire 2, also in a general tire, heat release can be promoted by the dimples 62.

The dimensions and angles of each component of the tire are measured in a state where the tire is mounted on a normal rim and inflated to a normal internal pressure, unless otherwise specified. During the measurement, no load is applied to the tire. In the present specification, the normal rim means a rim specified in a standard on which the tire is based. The "standard rim" in the JATMA standard, the "Design Rim" in the TRA standard, and the "Measuring Rim" in the ETRTO standard are normal rims. In the present specification, the normal internal pressure means an internal pressure specified in the standard on which the tire is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures. It should be noted that in the case of a tire for passenger car, the dimensions and angles are measured in a state where the internal pressure is 180 kPa.

Figure 6:
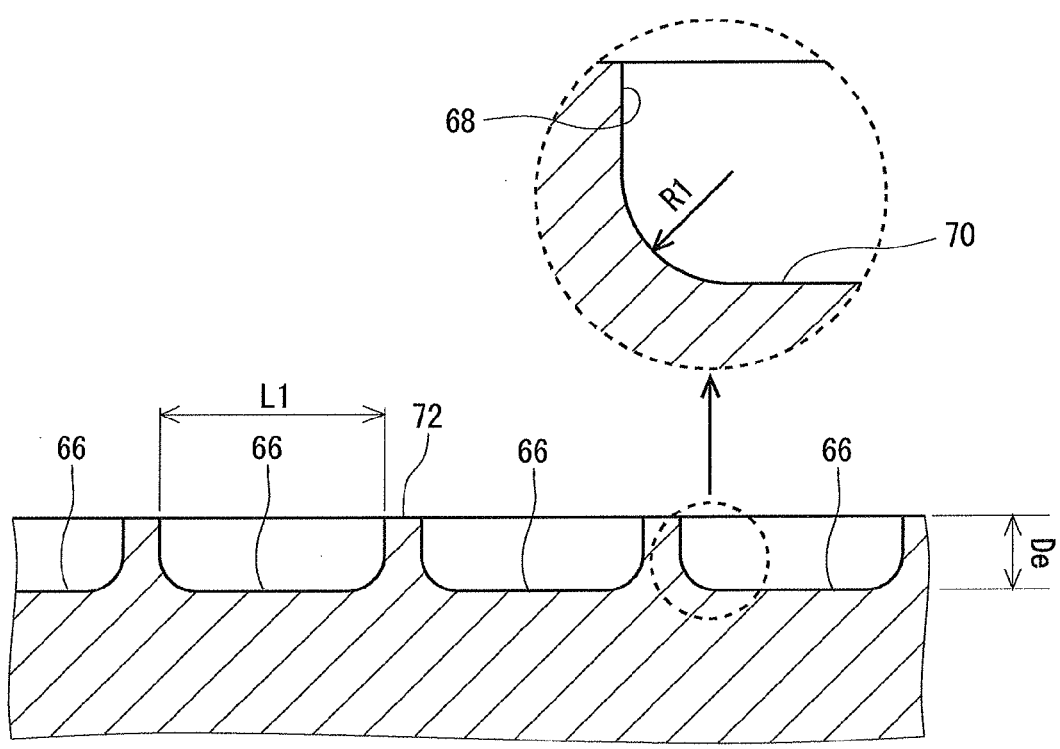
FIG. 6 is a cross-sectional view showing a portion of a tire according to another embodiment of the present invention.

FIG. 6 is a cross-sectional view showing a portion of a tire according to another embodiment of the present invention. In FIG. 6, the right-left direction is the circumferential direction, and the up-down direction is the axial direction. FIG. 6 shows dimples 66. A pattern of the dimples 66 is the same as a pattern in the tire 2 shown in FIG. 1.

Each of the dimples 66 has a side surface 68 and a bottom surface 70. The side surface 68 is connected to a land 72. The bottom surface 70 is connected to the side surface 68. The corner between the side surface 68 and the bottom surface 70 is rounded. The rounding suppresses concentration of stress on the corner and can prevent a crack. In FIG. 6, an arrow R1 indicates the curvature radius of the rounded corner. In light of prevention of a crack, the curvature radius R1 is preferably equal to or greater than 0.5 mm. In light of reduction in the weight of the tire, the curvature radius R1 is preferably equal to or less than 2.0 mm.

Figure 7:
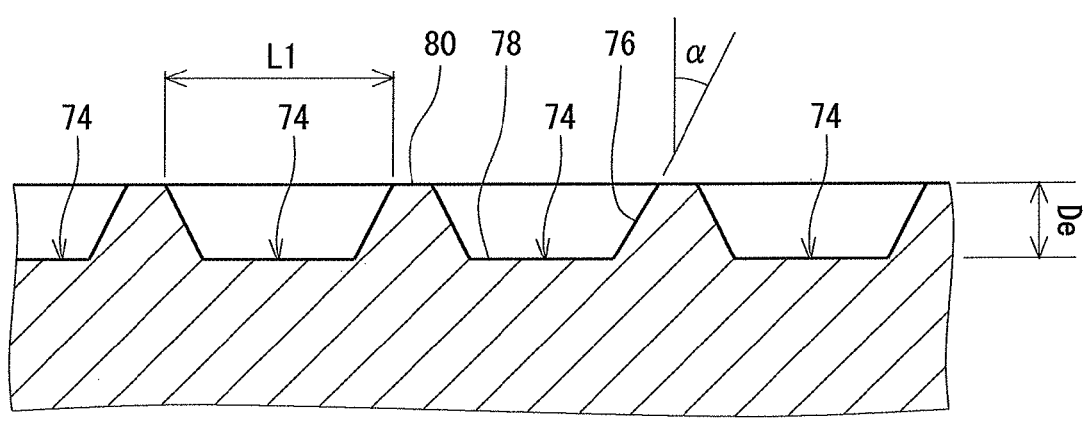
FIG. 7 is a cross-sectional view showing a portion of a tire according to still another embodiment of the present invention.

FIG. 7 is a cross-sectional view showing a portion of a tire according to still another embodiment of the present invention. In FIG. 7, the right-left direction is the circumferential direction, and the up-down direction is the axial direction. FIG. 7 shows dimples 74. A pattern of the dimples 74 is the same as the pattern in the tire 2 shown in FIG. 1.

Each of the dimples 74 has a side surface 76 and a bottom surface 78. The side surface 76 is connected to a land 80. The bottom surface 78 is connected to the side surface 76. The side surface 76 is tilted relative to a depth direction. In other words, the side surface 76 is a slope. The side surface 76 guides turbulent flow to the inside of the dimple 74. In this respect, the tilt angle $\alpha$ of the side surface 76 relative to the depth direction is preferably equal to or greater than 30° and particularly preferably equal to or greater than 40°. In light of reduction in the weight of the tire, the tilt angle $\alpha$ is preferably equal to or less than 60° and particularly preferably equal to or less than 50°.

Figure 8:
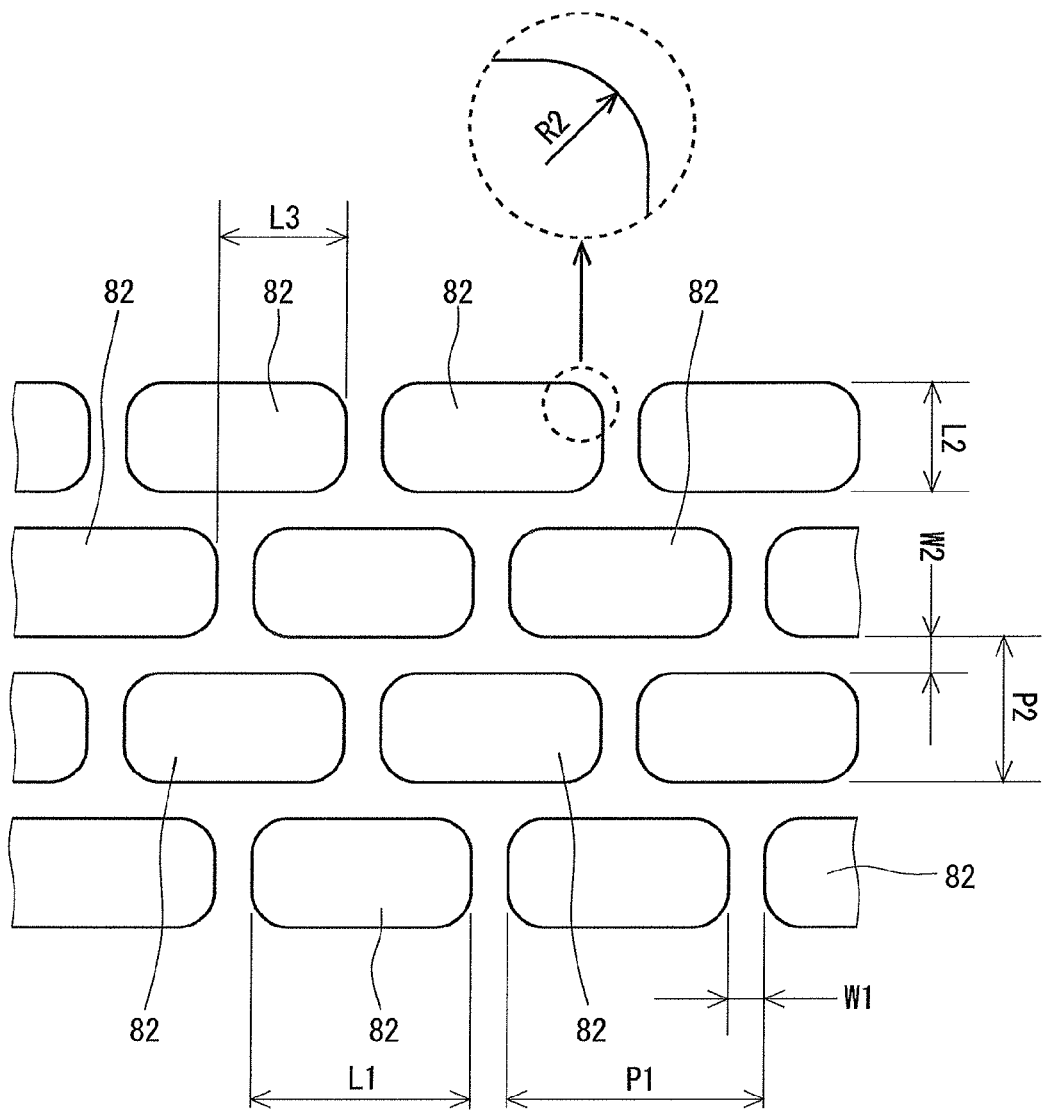
FIG. 8 is a front view showing a portion of a tire according to still another embodiment of the present invention.

FIG. 8 is a front view showing a portion of a tire according to still another embodiment of the present invention. FIG. 8 shows a sidewall of the tire. In FIG. 8, the right-left direction is the circumferential direction, and the up-down direction is the radial direction. FIG. 8 shows dimples 82.

The contour of each of the dimples 82 is substantially a rectangle. In the dimple 82, the length L1 in the circumferential direction is longer than the length L2 in the radial direction. Each corner of the dimple 82 is rounded. From the standpoint that soil is less likely to be jammed at the corner, the curvature radius R2 of the rounded corner is preferably equal to or greater than 0.5 mm and particularly preferably equal to or greater than 1.0 mm. In light of reduction in the weight of the tire, the curvature radius R2 is preferably equal to or less than 3.0 mm and particularly preferably equal to or less than 2.5 mm.

Figure 9:
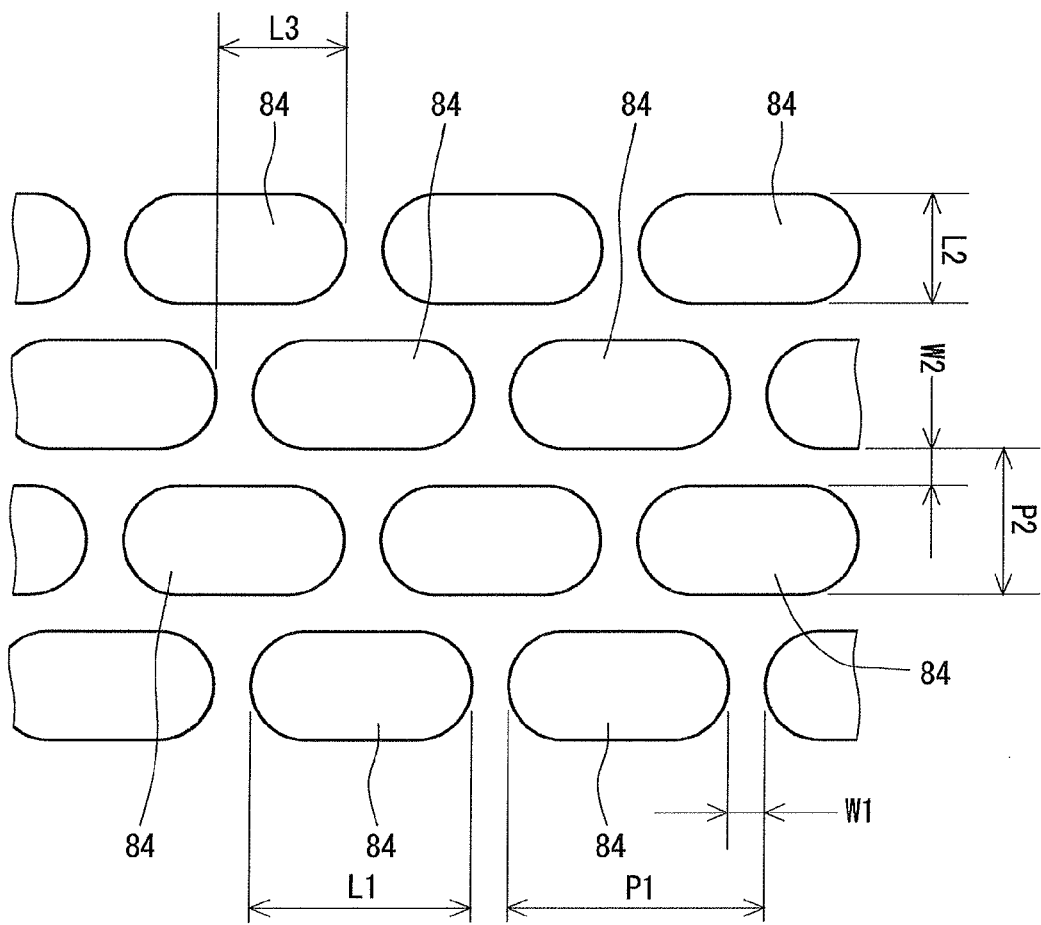
FIG. 9 is a front view showing a portion of a tire according to still another embodiment of the present invention.

FIG. 9 is a front view showing a portion of a tire according to still another embodiment of the present invention. FIG. 9 shows a sidewall of the tire. In FIG. 9, the right-left direction is the circumferential direction, and the up-down direction is the radial direction. FIG. 9 shows dimples 84.

The contour of each of the dimples 84 is an elongated circle. In the dimple 84, the length L1 in the circumferential direction is longer than the length L2 in the radial direction. The dimple 84 does not have any corner. In the dimple, stress concentration can be suppressed.

Figure 10:
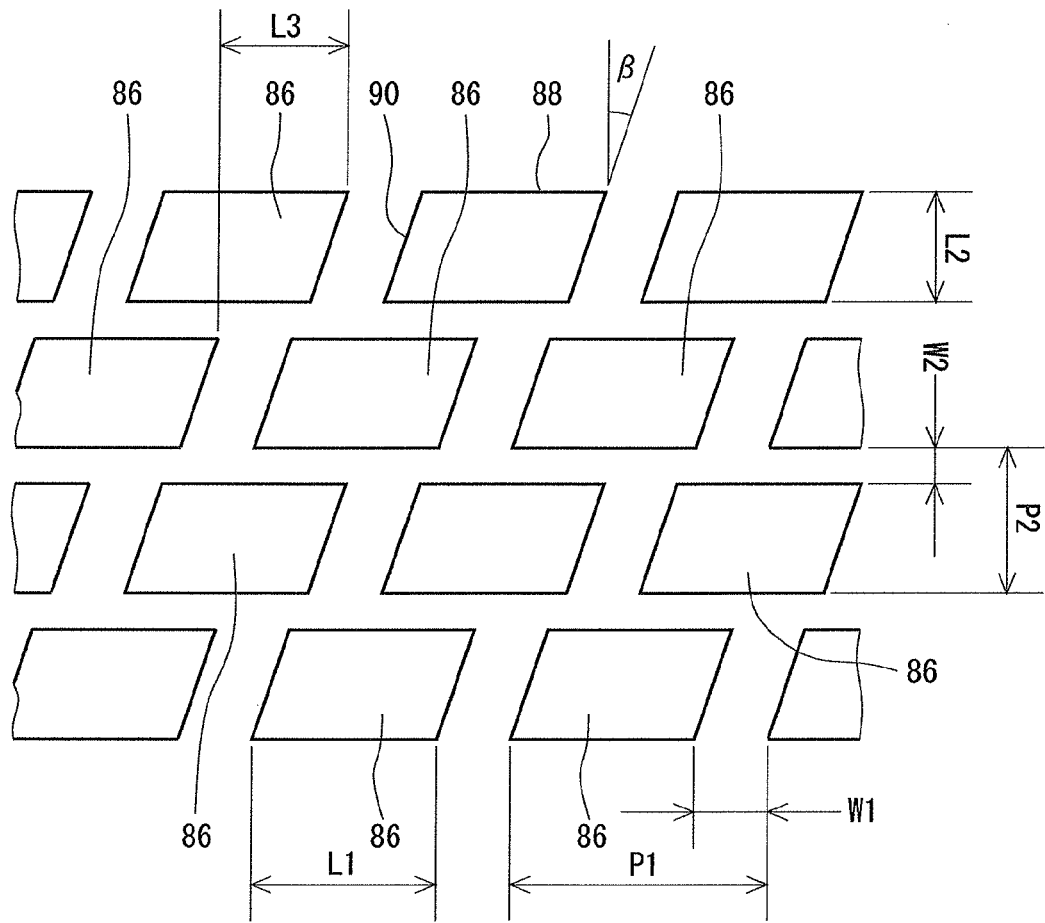
FIG. 10 is a front view showing a portion of a tire according to still another embodiment of the present invention.

FIG. 10 is a front view showing a portion of a tire according to still another embodiment of the present invention. FIG. 10 shows a sidewall of the tire. In FIG. 10, the right-left direction is the circumferential direction, and the up-down direction is the radial direction. FIG. 10 shows dimples 86.

The contour of each of the dimples 86 is a parallelogram. The dimple 86 has long sides 88 and short sides 90. In the dimple 86, the length L1 in the circumferential direction is longer than the length L2 in the radial direction. The short sides 90 of the dimple 86 are tilted relative to the radial direction. In light of suppression of stress concentration, the tilt angle β is preferably equal to or less than 20° and particularly preferably equal to or less than 15°.

Figure 11A:
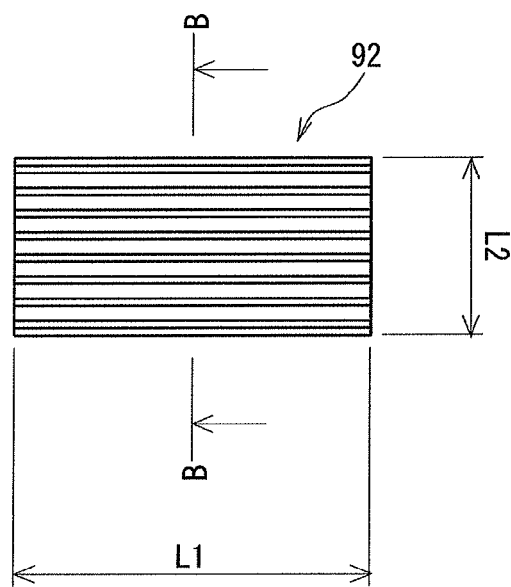
FIG. 11A is a front view showing a portion of a tire according to still another embodiment of the present invention.
Figure 11B:
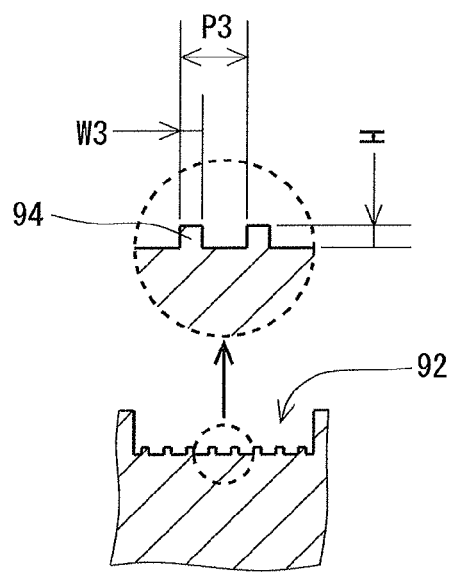
FIG. 11B is a cross-sectional view taken along a line B-B in FIG. 11A.

FIG. 11A is a front view showing a portion of a tire according to still another embodiment of the present invention, and FIG. 11B is a cross-sectional view taken along a line B-B in FIG. 11A. FIG. 11 shows a dimple 92. In FIG. 11A, the right-left direction is the circumferential direction, and the up-down direction is the radial direction. A pattern of dimples 92 is the same as the pattern in the tire 2 shown in FIG. 1.

The contour of each of the dimples 92 is a rectangle. The dimple 92 has multiple ridges 94 on a bottom surface thereof. Each ridge extends in the circumferential direction. In the dimple 92 having the ridges 94, the surface area of the bottom surface is large. The large surface area promotes heat release. In this respect, a pitch P3 between the ridges 94 is preferably equal to or less than 2.0 mm, the width W3 of each ridge 94 is preferably equal to or greater than 0.2 mm, and the height H of each ridge 94 is preferably equal to or greater than 0.2 mm. In light of reduction in the weight of the tire, the pitch P3 between the ridges 94 is preferably equal to or greater than 0.5 mm, the width W3 of each ridge 94 is preferably equal to or less than 0.5 mm, and the height H of each ridge 94 is preferably equal to or less than 0.5 mm. The ridges 94 may be tilted relative to the circumferential direction. The tilt angle is preferably equal to or less than 20°.

EXAMPLES

The following will show effects of the present invention by means of examples, but the present invention should not be construed in a limited manner based on the description of these examples.

Experiment 1

Example 1

The run flat tire shown in FIGS. 1 to 4 was produced. The size of the tire was "235/55R18 100V". The tire has a large number of rectangular dimples. The positions of the dimples are the positions A to F shown in FIG. 5.

Examples 2 to 5 and Comparative Examples 4 and 5

Tires of Examples 2 to 5 and Comparative Examples 4 and 5 were obtained in the same manner as Example 1, except dimples having different sizes were provided.

Comparative Example 1

A tire of Comparative Example 1 was obtained in the same manner as Example 1, except no dimples were provided.

Comparative Examples 2 and 3 and Example 6

A tire of Comparative Example 2 was obtained in the same manner as Example 1, except circular dimples were provided. A tire of Comparative Example 3 was obtained in the same manner as Example 1, except elliptical dimples were provided. A tire of Example 6 was obtained in the same manner as Example 1, except elongated-circular dimples were provided. The elongated-circular dimples are shown in FIG. 9.

[Weight]

The weight of each tire was measured, and the difference from the weight of the tire of Comparative Example 1 was calculated. The results are shown in Tables 1 and 2 below. A lower value indicates a better result.

[Running Distance]

Each tire was mounted on a normal rim and inflated such that the internal pressure thereof became 220 kPa. A valve core of the tire was removed to cause the inside of the tire to communicate with the atmosphere. The tire was run on a drum at a speed of 80 km/h with a load of 5.1 kN applied to the tire. A running distance until abnormal noise was generated from the tire was measured. The results are shown as indexes in Tables 1 and 2 below. A higher value indicates a better result.

TABLE 1

Results of Experiment 1

| | Comp. Ex. 1 | Comp. Ex. 2 | Comp. Ex. 3 | Comp. Ex. 4 | Ex. 2 | Ex. 1 |
|---|---|---|---|---|---|---|
| Contours of Dimples | — | Circle | Ellipse | Rectangle | Rectangle | Rectangle |
| Arrangement | — | Zigzag | Zigzag | Zigzag | Zigzag | Zigzag |
| Position A | None | Presence | Presence | Presence | Presence | Presence |
| Position B | None | Presence | Presence | Presence | Presence | Presence |
| Position C | None | Presence | Presence | Presence | Presence | Presence |
| Position D | None | Presence | Presence | Presence | Presence | Presence |
| Position E | None | Presence | Presence | Presence | Presence | Presence |
| Position F | None | Presence | Presence | Presence | Presence | Presence |
| Length L1 (mm) | — | 8.0 | 16.0 | 12.0 | 13.5 | 16.0 |
| Length L2 (mm) | — | 8.0 | 8.0 | 8.0 | 8.0 | 8.0 |

TABLE 1-continued

Results of Experiment 1

| | Comp. Ex. 1 | Comp. Ex. 2 | Comp. Ex. 3 | Comp. Ex. 4 | Ex. 2 | Ex. 1 |
|---|---|---|---|---|---|---|
| Pitch P1 (mm) | — | 8.5 | 17.0 | 17.0 | 17.0 | 17.0 |
| Pitch P2 (mm) | — | 8.5 | 8.5 | 8.5 | 8.5 | 8.5 |
| Depth De (mm) | — | 2.0 | 2.0 | 2.0 | 2.0 | 2.0 |
| Angle α (deg.) | — | 45 | 0 | 0 | 0 | 0 |
| Radius R1 (mm) | — | — | — | — | — | — |
| Radius R2 (mm) | — | — | — | — | — | — |
| Area occupation ratio (%) | — | 23 | 70 | 66 | 75 | 89 |
| Weight (g)* | 0 | 321 | 127 | 140 | 106 | 48 |
| Distance (index) | 100 | 130 | 130 | 120 | 135 | 140 |

*Difference from Comparative Example 1

TABLE 2

Results of Experiment 1

| | Ex. 3 | Ex. 4 | Ex. 5 | Comp. Ex. 5 | Ex. 6 |
|---|---|---|---|---|---|
| Contours of Dimples | Rectangle | Rectangle | Rectangle | Rectangle | Elongated circle |
| Arrangement | Zigzag | Zigzag | Zigzag | Zigzag | Zigzag |
| Position A | Presence | Presence | Presence | Presence | Presence |
| Position B | Presence | Presence | Presence | Presence | Presence |
| Position C | Presence | Presence | Presence | Presence | Presence |
| Position D | Presence | Presence | Presence | Presence | Presence |
| Position E | Presence | Presence | Presence | Presence | Presence |
| Position F | Presence | Presence | Presence | Presence | Presence |
| Length L1 (mm) | 19.0 | 39.0 | 59.0 | 79.0 | 16.0 |
| Length L2 (mm) | 8.0 | 8.0 | 8.0 | 8.0 | 8.0 |
| Pitch P1 (mm) | 20.0 | 40.0 | 60.0 | 80.0 | 17.0 |
| Pitch P2 (mm) | 8.5 | 8.5 | 8.5 | 8.5 | 8.5 |
| Depth De (mm) | 2.0 | 2.0 | 2.0 | 2.0 | 2.0 |
| Angle α (deg.) | 0 | 0 | 0 | 0 | 0 |
| Radius R1 (mm) | — | — | — | — | — |
| Radius R2 (mm) | — | — | — | — | — |
| Area occupation ratio (%) | 89 | 92 | 93 | 95 | 79 |
| Weight (g)* | 44 | 34 | 31 | 20 | 88 |
| Distance (index) | 150 | 135 | 130 | 120 | 137 |

*Difference from Comparative Example 1

Experiment 2

Examples 7 to 10

Tires of Examples 7 to 10 were obtained in the same manner as Example 1, except dimples whose contours are parallelograms were provided.

[Weight]

In the same manner as Experiment 1, a difference in weight was calculated. The results are shown in Tables 3 and 4 below.

[Running Distance]

A running distance was measured by the same method as that in Experiment 1. The results are shown as indexes in Tables 3 and 4 below. It should be noted that running distances were measured for both forward rotation and reverse rotation. In forward rotation, a direction of moving from left to right in FIG. 10 is the rotating direction of the tire. In reverse rotation, a direction of moving from right to left in FIG. 10 is the rotating direction of the tire.

TABLE 3

Results of Experiment 2

| | Comp. Ex. 3 | Ex. 1 | Ex. 7 |
|---|---|---|---|
| Contours of Dimples | Ellipse | Rectangle | Parallelogram |
| Arrangement | Zigzag | Zigzag | Zigzag |
| Position A | Presence | Presence | Presence |
| Position B | Presence | Presence | Presence |
| Position C | Presence | Presence | Presence |
| Position D | Presence | Presence | Presence |
| Position E | Presence | Presence | Presence |
| Position F | Presence | Presence | Presence |
| Length L1 (mm) | 16.0 | 16.0 | 16.0 |
| Length L2 (mm) | 8.0 | 8.0 | 8.0 |
| Pitch P1 (mm) | 17.0 | 17.0 | 17.0 |
| Pitch P2 (mm) | 8.5 | 8.5 | 8.5 |
| Depth De (mm) | 2.0 | 2.0 | 2.0 |
| Angle α (deg.) | 0 | 0 | 0 |
| Angle β (deg.) | — | 0 | 5 |
| Radius R1 (mm) | — | — | — |
| Radius R2 (mm) | — | — | — |
| Area occupation ratio (%) | 70 | 89 | 89 |
| Weight (g) * | 127 | 48 | 48 |
| Distance in forward rotation (index) | 130 | 140 | 142 |
| Distance in reverse rotation (index) | 130 | 140 | 138 |

* Difference from Comparative Example 1

TABLE 4

Results of Experiment 2

|  | Ex. 8 | Ex. 9 | Ex. 10 |
|---|---|---|---|
| Contours of Dimples | Parallelogram | Parallelogram | Parallelogram |
| Arrangement | Zigzag | Zigzag | Zigzag |
| Position A | Presence | Presence | Presence |
| Position B | Presence | Presence | Presence |
| Position C | Presence | Presence | Presence |
| Position D | Presence | Presence | Presence |
| Position E | Presence | Presence | Presence |
| Position F | Presence | Presence | Presence |
| Length L1 (mm) | 16.0 | 16.0 | 16.0 |
| Length L2 (mm) | 8.0 | 8.0 | 8.0 |
| Pitch P1 (mm) | 17.0 | 17.0 | 17.0 |
| Pitch P2 (mm) | 8.5 | 8.5 | 8.5 |
| Depth De (mm) | 2.0 | 2.0 | 2.0 |
| Angle α (deg.) | 0 | 0 | 0 |
| Angle β (deg.) | 15 | 20 | 30 |
| Radius R1 (mm) | — | — | — |
| Radius R2 (mm) | — | — | — |
| Area occupation ratio (%) | 89 | 89 | 89 |
| Weight tire (g) * | 48 | 48 | 48 |
| Distance in forward rotation (index) | 144 | 145 | 145 |
| Distance in reverse rotation (index) | 135 | 130 | 120 |

* Difference from Comparative Example 1

Experiment 3

Examples 11 to 16

Tires of Examples 11 to 16 were obtained in the same manner as Example 1, except the depths De (see FIG. 4) of the dimples were as shown in Tables 5 and 6 below.

[Weight]

In the same manner as Experiment 1, a difference in weight was calculated. The results are shown in Tables 5 and 6 below.

[Running Distance]

A running distance was measured by the same method as that in Experiment 1. The results are shown as indexes in Tables 5 and 6 below.

TABLE 5

Results of Experiment 3

|  | Comp. Ex. 3 | Ex. 11 | Ex. 12 | Ex. 13 |
|---|---|---|---|---|
| Contours of Dimples | Ellipse | Rectangle | Rectangle | Rectangle |
| Arrangement | Zigzag | Zigzag | Zigzag | Zigzag |
| Position A | Presence | Presence | Presence | Presence |
| Position B | Presence | Presence | Presence | Presence |
| Position C | Presence | Presence | Presence | Presence |
| Position D | Presence | Presence | Presence | Presence |
| Position E | Presence | Presence | Presence | Presence |
| Position F | Presence | Presence | Presence | Presence |
| Length L1 (mm) | 16.0 | 16.0 | 16.0 | 16.0 |
| Length L2 (mm) | 8.0 | 8.0 | 8.0 | 8.0 |
| Pitch P1 (mm) | 17.0 | 17.0 | 17.0 | 17.0 |
| Pitch P2 (mm) | 8.5 | 8.5 | 8.5 | 8.5 |
| Depth De (mm) | 2.0 | 0.3 | 0.5 | 1.0 |
| Angle α (deg.) | 0 | 0 | 0 | 0 |
| Radius R1 (mm) | — | — | — | — |
| Radius R2 (mm) | — | — | — | — |
| Area occupation ratio (%) | 70 | 89 | 89 | 89 |
| Weight (g)* | 127 | 7 | 12 | 24 |
| Distance (index) | 130 | 110 | 130 | 133 |

*Difference from Comparative Example 1

TABLE 6

Results of Experiment 3

|  | Ex. 1 | Ex. 14 | Ex. 15 | Ex. 16 |
|---|---|---|---|---|
| Contours of Dimples | Rectangle | Rectangle | Rectangle | Rectangle |
| Arrangement | Zigzag | Zigzag | Zigzag | Zigzag |
| Position A | Presence | Presence | Presence | Presence |
| Position B | Presence | Presence | Presence | Presence |
| Position C | Presence | Presence | Presence | Presence |
| Position D | Presence | Presence | Presence | Presence |
| Position E | Presence | Presence | Presence | Presence |
| Position F | Presence | Presence | Presence | Presence |
| Length L1 (mm) | 16.0 | 16.0 | 16.0 | 16.0 |
| Length L2 (mm) | 8.0 | 8.0 | 8.0 | 8.0 |
| Pitch P1 (mm) | 17.0 | 17.0 | 17.0 | 17.0 |
| Pitch P2 (mm) | 8.5 | 8.5 | 8.5 | 8.5 |
| Depth De (mm) | 2.0 | 3.0 | 4.0 | 5.0 |
| Angle α (deg.) | 0 | 0 | 0 | 0 |
| Radius R1 (mm) | — | — | — | — |
| Radius R2 (mm) | — | — | — | — |
| Area occupation ratio (%) | 89 | 89 | 89 | 89 |
| Weight (g)* | 48 | 72 | 96 | 119 |
| Running distance (index) | 140 | 140 | 150 | 150 |

*Difference from Comparative Example 1

Experiment 4

Examples 17 to 19

Tires of Examples 17 to 19 were obtained in the same manner as Example 1, except the curvature radius R2 (see FIG. 8) of each corner of the contour of each dimple was as shown in Table 7 below.

[Weight]

In the same manner as Experiment 1, a difference in weight was calculated. The results are shown in Table 7 below.

[Running Distance]

A running distance was measured by the same method as that in Experiment 1. The results are shown as indexes in Table 7 below.

[Easiness of Cleaning]

Each tire was allowed to stand in the sun for 2 weeks to change its color to brown. The tire was cleaned with a sponge or a brush, and the evaluation was categorized based on the following criteria. The results are shown in Table 7 below.

A: Dirt is removed only with the sponge.
B: Dirt is removed with the brush.
C: Dirt remained at the corners of the dimples even when the brush is used.

TABLE 7

Results of Experiment 4

| | Comp. Ex. 3 | Ex. 1 | Ex. 17 | Ex. 18 | Ex. 19 |
|---|---|---|---|---|---|
| Contours of Dimples | Ellipse | Rect-angle | Rect-angle | Rect-angle | Rect-angle |
| Arrangement | Zigzag | Zigzag | Zigzag | Zigzag | Zigzag |
| Position A | Presence | Presence | Presence | Presence | Presence |
| Position B | Presence | Presence | Presence | Presence | Presence |
| Position C | Presence | Presence | Presence | Presence | Presence |
| Position D | Presence | Presence | Presence | Presence | Presence |
| Position E | Presence | Presence | Presence | Presence | Presence |
| Position F | Presence | Presence | Presence | Presence | Presence |
| Length L1 (mm) | 16.0 | 16.0 | 16.0 | 16.0 | 16.0 |
| Length L2 (mm) | 8.0 | 8.0 | 8.0 | 8.0 | 8.0 |
| Pitch P1 (mm) | 17.0 | 17.0 | 17.0 | 17.0 | 17.0 |
| Pitch P2 (mm) | 8.5 | 8.5 | 8.5 | 8.5 | 8.5 |
| Depth De (mm) | 2.0 | 2.0 | 2.0 | 2.0 | 2.0 |
| Angle α (deg.) | 0 | 0 | 0 | 0 | 0 |
| Radius R1 (mm) | — | — | — | — | — |
| Radius R2 (mm) | — | — | 0.5 | 3.0 | 4.0 |
| Area occupation ratio (%) | 70 | 89 | 88 | 83 | 79 |
| Weight (g)* | 127 | 48 | 48 | 70 | 88 |
| Distance (index) | 130 | 140 | 140 | 140 | 137 |
| Easiness of cleaning | C | C | B | A | A |

*Difference from Comparative Example 1

Experiment 5

Examples 20 to 24

Tire of Examples 20 to 24 were obtained in the same manner as Example 1, except the curvature radius R1 (see FIG. 6) of the corner between the side surface and the bottom surface of each dimple was as shown in Tables 8 and 9 below.

[Weight]

In the same manner as Experiment 1, a difference in weight was calculated. The results are shown in Tables 8 and 9 below.

[Running Distance]

A running distance was measured by the same method as that in Experiment 1. The results are shown as indexes in Tables 8 and 9 below.

[Crack Occurrence Rate]

Each tire was mounted on a normal rim and inflated such that the internal pressure thereof became 200 kPa. The tire was run on a drum at a speed of 80 km/h with a load of 8.0 kN applied to the tire. The running was stopped at the time when the running distance reached 15000 km, and the surface of the tire was visually observed. The number of dimples in which a crack had occurred was counted. The results are shown in Tables 8 and 9 below. A lower value indicates a better result.

TABLE 8

Results of Experiment 5

| | Comp. Ex. 3 | Ex. 1 | Ex. 20 | Ex. 21 |
|---|---|---|---|---|
| Contours of Dimples | Ellipse | Rect-angle | Rect-angle | Rect-angle |
| Arrangement | Zigzag | Zigzag | Zigzag | Zigzag |
| Position A | Presence | Presence | Presence | Presence |
| Position B | Presence | Presence | Presence | Presence |
| Position C | Presence | Presence | Presence | Presence |
| Position D | Presence | Presence | Presence | Presence |
| Position E | Presence | Presence | Presence | Presence |
| Position F | Presence | Presence | Presence | Presence |
| Length L1 (mm) | 16.0 | 16.0 | 16.0 | 16.0 |
| Length L2 (mm) | 8.0 | 8.0 | 8.0 | 8.0 |
| Pitch P1 (mm) | 17.0 | 17.0 | 17.0 | 17.0 |
| Pitch P2 (mm) | 8.5 | 8.5 | 8.5 | 8.5 |
| Depth De (mm) | 2.0 | 2.0 | 2.0 | 2.0 |
| Angle α (deg.) | 0 | 0 | 0 | 0 |
| R1 in circumferential direction (mm) | — | — | 0.5 | 1.6 |
| R1 in radial direction (mm) | — | — | 0.5 | 1.6 |
| Radius R2 (mm) | — | — | — | — |
| Area occupation ratio (%) | 70 | 89 | 89 | 89 |
| Weight of tire (g)* | 127 | 48 | 55 | 124 |
| Distance (index) | 130 | 140 | 140 | 143 |
| Crack rate (%) | 7 | 7 | 0 | 0 |

*Difference from Comparative Example 1

TABLE 9

Results of Experiment 5

| | Ex. 22 | Ex. 23 | Ex. 24 |
|---|---|---|---|
| Contours of Dimples | Rect-angle | Rect-angle | Rect-angle |
| Arrangement | Zigzag | Zigzag | Zigzag |
| Position A | Presence | Presence | Presence |
| Position B | Presence | Presence | Presence |
| Position C | Presence | Presence | Presence |
| Position D | Presence | Presence | Presence |
| Position E | Presence | Presence | Presence |
| Position F | Presence | Presence | Presence |
| Length L1 (mm) | 16.0 | 16.0 | 16.0 |
| Length L2 (mm) | 8.0 | 8.0 | 8.0 |
| Pitch P1 (mm) | 17.0 | 17.0 | 17.0 |
| Pitch P2 (mm) | 8.5 | 8.5 | 8.5 |
| Depth De (mm) | 2.0 | 2.0 | 2.0 |
| Angle α (deg.) | 0 | 0 | 0 |
| R1 in circumferential direction (mm) | 0.5 | 2.0 | 3.0 |
| R1 in radial direction (mm) | — | — | — |
| Radius R2 (mm) | — | — | — |
| Area occupation ratio (%) | 89 | 89 | 89 |
| Weight of tire (g)* | 53 | 127 | 166 |
| Distance (index) | 140 | 143 | 143 |
| Crack rate (%) | 0 | 0 | 0 |

*Difference from Comparative Example 1

Experiment 6

Examples 25 to 27

Tires of Examples 25 to 27 were obtained in the same manner as Example 1, except the tilt angle α (see FIG. 7) of each side wall relative to the radial direction was as shown in Table 10 below.

[Weight]

In the same manner as Experiment 1, a difference in weight was calculated. The results are shown in Table 10 below.

[Running Distance]

A running distance was measured by the same method as that in Experiment 1. The results are shown as indexes in Table 10.

TABLE 10

Results of Experiment 6

|  | Comp. Ex. 3 | Ex. 1 | Ex. 25 | Ex. 26 | Ex. 27 |
|---|---|---|---|---|---|
| Contours of Dimples | Ellipse | Rectangle | Rectangle | Rectangle | Rectangle |
| Arrangement | Zigzag | Zigzag | Zigzag | Zigzag | Zigzag |
| Position A | Presence | Presence | Presence | Presence | Presence |
| Position B | Presence | Presence | Presence | Presence | Presence |
| Position C | Presence | Presence | Presence | Presence | Presence |
| Position D | Presence | Presence | Presence | Presence | Presence |
| Position E | Presence | Presence | Presence | Presence | Presence |
| Position F | Presence | Presence | Presence | Presence | Presence |
| Length L1 (mm) | 16.0 | 16.0 | 16.0 | 16.0 | 16.0 |
| Length L2 (mm) | 8.0 | 8.0 | 8.0 | 8.0 | 8.0 |
| Pitch P1 (mm) | 17.0 | 17.0 | 17.0 | 17.0 | 17.0 |
| Pitch P2 (mm) | 8.5 | 8.5 | 8.5 | 8.5 | 8.5 |
| Depth De (mm) | 2.0 | 2.0 | 2.0 | 2.0 | 2.0 |
| Angle α (deg.) | 0 | 0 | 30 | 45 | 60 |
| Radius R1 (mm) | — | — | — | — | — |
| Radius R2 (mm) | — | — | — | — | — |
| Area occupation ratio (%) | 70 | 89 | 89 | 89 | 89 |
| Weighte (g)* | 127 | 48 | 101 | 140 | 208 |
| Distance (index) | 130 | 140 | 142 | 145 | 145 |

*Difference from Comparative Example 1

Experiment 7

Examples 28 to 33 and Comparative Examples 6 and 7

Tires of Examples 28 to 33 and Comparative Examples 6 and 7 were obtained in the same manner as Example 1, except the widths W1 and W2 (see FIG. 3) of the land were as shown in Tables 11 and 12 below.

[Weight]

In the same manner as Experiment 1, a difference in weight was calculated. The results are shown in Tables 11 and 12 below.

[Running Distance]

A running distance was measured by the same method as that in Experiment 1. The results are shown as indexes in Tables 11 and 12 below.

TABLE 11

Results of Experiment 7

|  | Comp. Ex. 3 | Ex. 28 | Ex. 1 | Ex. 29 | Ex. 30 | Comp. Ex. 6 |
|---|---|---|---|---|---|---|
| Contours of Dimples | Ellipse | Rectangle | Rectangle | Rectangle | Rectangle | Rectangle |
| Arrangement | Zigzag | Zigzag | Zigzag | Zigzag | Zigzag | Zigzag |
| Position A | Presence | Presence | Presence | Presence | Presence | Presence |
| Position B | Presence | Presence | Presence | Presence | Presence | Presence |
| Position C | Presence | Presence | Presence | Presence | Presence | Presence |
| Position D | Presence | Presence | Presence | Presence | Presence | Presence |
| Position E | Presence | Presence | Presence | Presence | Presence | Presence |
| Position F | Presence | Presence | Presence | Presence | Presence | Presence |
| Length L1 (mm) | 16.0 | 16.7 | 16.0 | 15.0 | 14.0 | 13.0 |
| Length L2 (mm) | 8.0 | 8.0 | 8.0 | 8.0 | 8.0 | 8.0 |
| Pitch P1 (mm) | 17.0 | 17.0 | 17.0 | 17.0 | 17.0 | 17.0 |
| Pitch P2 (mm) | 8.5 | 8.5 | 8.5 | 8.5 | 8.5 | 8.5 |
| Land width |  |  |  |  |  |  |
| W1 (mm) | 0.3 | 0.3 | 1.0 | 2.0 | 3.0 | 4.0 |
| W2 (mm) | 0.5 | 0.5 | 0.5 | 0.5 | 0.5 | 0.5 |
| Depth De (mm) | 2.0 | 2.0 | 2.0 | 2.0 | 2.0 | 2.0 |
| Angle α (deg.) | 0 | 0 | 0 | 0 | 0 | 0 |
| Radius R1 (mm) | — | — | — | — | — | — |
| Radius R2 (mm) | — | — | — | — | — | — |
| Occupation ratio (%) | 70 | 92 | 89 | 82 | 76 | 70 |
| Weight (g)* | 127 | 32 | 48 | 74 | 99 | 124 |
| Distance | 130 | 130 | 140 | 150 | 140 | 130 |

*Difference from Comparative Example 1

TABLE 12

Results of Experiment 7

|  | Ex. 31 | Ex. 32 | Ex. 33 | Comp. Ex. 7 |
|---|---|---|---|---|
| Contours of Dimples | Rectangle | Rectangle | Rectangle | Rectangle |
| Arrangement | Zigzag | Zigzag | Zigzag | Zigzag |
| Position A | Presence | Presence | Presence | Presence |
| Position B | Presence | Presence | Presence | Presence |
| Position C | Presence | Presence | Presence | Presence |
| Position D | Presence | Presence | Presence | Presence |
| Position E | Presence | Presence | Presence | Presence |
| Position F | Presence | Presence | Presence | Presence |
| Length L1 (mm) | 16.0 | 16.0 | 16.0 | 16.0 |
| Length L2 (mm) | 8.2 | 7.5 | 7.0 | 6.5 |
| Pitch P1 (mm) | 17.0 | 17.0 | 17.0 | 17.0 |
| Pitch P2 (mm) | 8.5 | 8.5 | 8.5 | 8.5 |
| Land width |  |  |  |  |
| W1 (mm) | 1.0 | 1.0 | 1.0 | 1.0 |
| W2 (mm) | 0.3 | 1.0 | 1.5 | 2.0 |
| Depth De (mm) | 2.0 | 2.0 | 2.0 | 2.0 |
| Angle α (deg.) | 0 | 0 | 0 | 0 |
| Radius R1 (mm) | — | — | — | — |
| Radius R2 (mm) | — | — | — | — |
| Occupation ratio (%) | 91 | 83 | 78 | 72 |
| Weight (g)* | 39 | 71 | 94 | 117 |
| Distance | 130 | 140 | 140 | 140 |

*Difference from Comparative Example 1

Experiment 8

Examples 34 to 36

Tires of Examples 34 to 36 were obtained in the same manner as Example 1, except the distance L3 (see FIG. 3) was as shown in Table 13 below.

[Weight]

In the same manner as Experiment 1, a difference in weight was calculated. The results are shown in Table 13 below.

[Running Distance]

A running distance was measured by the same method as that in Experiment 1. The results are shown as indexes in Table 13 below.

TABLE 13

Results of Experiment 8

|  | Comp. Ex. 3 | Ex. 1 | Ex. 34 | Ex. 35 | Ex. 36 |
|---|---|---|---|---|---|
| Contours of Dimples | Ellipse | Rectangle | Rectangle | Rectangle | Rectangle |
| Position A | Presence | Presence | Presence | Presence | Presence |
| Position B | Presence | Presence | Presence | Presence | Presence |
| Position C | Presence | Presence | Presence | Presence | Presence |
| Position D | Presence | Presence | Presence | Presence | Presence |
| Position E | Presence | Presence | Presence | Presence | Presence |
| Position F | Presence | Presence | Presence | Presence | Presence |
| Length L1 (mm) | 16.0 | 16.0 | 16.0 | 16.0 | 16.0 |
| Length L2 (mm) | 8.0 | 8.0 | 8.0 | 8.0 | 8.0 |
| Pitch P1 (mm) | 17.0 | 17.0 | 17.0 | 17.0 | 17.0 |
| Pitch P2 (mm) | 8.5 | 8.5 | 8.5 | 8.5 | 8.5 |
| Distance L3 (mm) | 8.5 | 8.5 | 7.0 | 3.0 | 0.0 |
| Depth De (mm) | 2.0 | 2.0 | 2.0 | 2.0 | 2.0 |
| Angle α (deg.) | 0 | 0 | 0 | 0 | 0 |
| Radius R1 (mm) | — | — | — | — | — |
| Radius R2 (mm) | — | — | — | — | — |
| Area occupation ratio (%) | 70 | 89 | 89 | 89 | 89 |
| Weight (g)* | 127 | 48 | 48 | 48 | 48 |
| Distance (index) | 130 | 140 | 140 | 135 | 130 |

*Difference from Comparative Example 1

Experiment 9

Examples 37 to 39

Tires of Examples 37 to 39 were obtained in the same manner as Example 1, except the elimination rate of the dimples was as shown in Table 14 below.

[Weight]

In the same manner as Experiment 1, a difference in weight was calculated. The results are shown in Table 14 below.

[Running Distance]

A running distance was measured by the same method as that in Experiment 1. The results are shown as indexes in Table 14 below.

TABLE 14

Results of Experiment 9

|  | Comp. Ex. 3 | Ex. 1 | Ex. 37 | Ex. 38 | Ex. 39 |
|---|---|---|---|---|---|
| Contour | Ellipse | Rectangle | Rectangle | Rectangle | Rectangle |
| Arrangement | Zigzag | Zigzag | Zigzag | Zigzag | Zigzag |
| Position A | Presence | Presence | Presence | Presence | Presence |
| Position B | Presence | Presence | Presence | Presence | Presence |
| Position C | Presence | Presence | Presence | Presence | Presence |
| Position D | Presence | Presence | Presence | Presence | Presence |
| Position E | Presence | Presence | Presence | Presence | Presence |
| Position F | Presence | Presence | Presence | Presence | Presence |
| Length L1 (mm) | 16.0 | 16.0 | 16.0 | 16.0 | 16.0 |
| Length L2 (mm) | 8.0 | 8.0 | 8.0 | 8.0 | 8.0 |
| Pitch P1 (mm) | 17.0 | 17.0 | 17.0 | 17.0 | 17.0 |
| Pitch P2 (mm) | 8.5 | 8.5 | 8.5 | 8.5 | 8.5 |
| Depth De (mm) | 2.0 | 2.0 | 2.0 | 2.0 | 2.0 |
| Angle α (deg.) | 0 | 0 | 0 | 0 | 0 |
| Radius R1 (mm) | — | — | — | — | — |
| Radius R2 (mm) | — | — | — | — | — |
| Occupation ratio (%) | 70 | 89 | 89 | 89 | 89 |
| Eliminated dimples | 0 | 0 | 72 | 132 | 180 |
| Elimination rate (%) | 0 | 0 | 11 | 20 | 27 |

TABLE 14-continued

| | Results of Experiment 9 | | | | |
|---|---|---|---|---|---|
| | Comp. Ex. 3 | Ex. 1 | Ex. 37 | Ex. 38 | Ex. 39 |
| Weight (g)* | 127 | 48 | 88 | 121 | 148 |
| Distance | 130 | 140 | 133 | 130 | 110 |

*Difference from Comparative Example 1

Experiment 10

Example 40

A tire of Example 40 was obtained in the same manner as Example 1, except the ridges shown in FIG. 11 were formed on the bottom surface of each dimple. The pitch P3 between the ridges was 1.0 mm, the width W3 of each ridge was 0.3 mm, and the height H of each ridge was 0.3 mm.

[Weight]

In the same manner as Experiment 1, a difference in weight was calculated. The results are shown in Table 15 below.

[Running Distance]

A running distance was measured by the same method as that in Experiment 1. The results are shown as indexes in Table 15 below.

TABLE 15

| | Results of Experiment 10 | | |
|---|---|---|---|
| | Comp. Ex. 3 | Ex. 1 | Ex. 40 |
| Contours of Dimples | Ellipse | Rectangle | Rectangle |
| Arrangement | Zigzag | Zigzag | Zigzag |
| Position A | Presence | Presence | Presence |
| Position B | Presence | Presence | Presence |
| Position C | Presence | Presence | Presence |
| Position D | Presence | Presence | Presence |
| Position E | Presence | Presence | Presence |
| Position F | Presence | Presence | Presence |
| Length L1 (mm) | 16.0 | 16.0 | 16.0 |
| Length L2 (mm) | 8.0 | 8.0 | 8.0 |
| Pitch P1 (mm) | 17.0 | 17.0 | 17.0 |
| Pitch P2 (mm) | 8.5 | 8.5 | 8.5 |
| Depth De (mm) | 2.0 | 2.0 | 2.0 |
| Angle α (deg.) | 0 | 0 | 0 |
| Radius R1 (mm) | — | — | — |
| Radius R2 (mm) | — | — | — |
| Occupation ratio (%) | 70 | 89 | 89 |
| Ridge | None | None | Presence |
| Weight (g)* | 127 | 48 | 81 |
| Distance (index) | 130 | 140 | 160 |

*Difference from Comparative Example 1

Experiment 11

Examples 41 to 45 and Comparative Example 8

Tires of Examples 41 to 45 and Comparative Example 8 were obtained in the same manner as Example 1, except the length L1 of each dimple and the pitch P1 between the dimples were as shown in Tables 16 and 17 below.

[Weight]

In the same manner as Experiment 1, a difference in weight was calculated. The results are shown in Tables 16 and 17 below.

[Running Distance]

A running distance was measured by the same method as that in Experiment 1. The results are shown as indexes in Tables 16 and 17 below.

TABLE 16

| | Results of Experiment 11 | | | |
|---|---|---|---|---|
| | Comp. Ex. 3 | Comp. Ex. 8 | Ex. 41 | Ex. 1 |
| Contours of Dimples | Ellipse | Rectangle | Rectangle | Rectangle |
| Arrangement | Zigzag | Zigzag | Zigzag | Zigzag |
| Position A | Presence | Presence | Presence | Presence |
| Position B | Presence | Presence | Presence | Presence |
| Position C | Presence | Presence | Presence | Presence |
| Position D | Presence | Presence | Presence | Presence |
| Position E | Presence | Presence | Presence | Presence |
| Position F | Presence | Presence | Presence | Presence |
| Length L1 (mm) | 16.0 | 2.0 | 4.0 | 16.0 |
| Length L2 (mm) | 8.0 | 8.0 | 8.0 | 8.0 |
| Pitch P1 (mm) | 17.0 | 3.0 | 5.0 | 17.0 |
| Pitch P2 (mm) | 8.5 | 8.5 | 8.5 | 8.5 |
| Depth De (mm) | 2.0 | 2.0 | 2.0 | 2.0 |
| Angle α (deg.) | 0 | 0 | 0 | 0 |
| Radius R1 (mm) | — | — | — | — |
| Radius R2 (mm) | — | — | — | — |
| Area occupation ratio (%) | 70 | 63 | 75 | 89 |
| Weight (g)* | 127 | 156 | 103 | 48 |
| Distance (index) | 130 | 115 | 130 | 140 |

*Difference from Comparative Example 1

TABLE 17

| | Results of Experiment 11 | | | |
|---|---|---|---|---|
| | Example 42 | Example 43 | Example 44 | Example 45 |
| Contours of Dimples | Rectangle | Rectangle | Rectangle | Rectangle |
| Arrangement | Zigzag | Zigzag | Zigzag | Zigzag |
| Position A | Presence | Presence | Presence | Presence |
| Position B | Presence | Presence | Presence | Presence |
| Position C | Presence | Presence | Presence | Presence |
| Position D | Presence | Presence | Presence | Presence |
| Position E | Presence | Presence | Presence | Presence |
| Position F | Presence | Presence | Presence | Presence |
| Length L1 (mm) | 29.0 | 44.0 | 59.0 | 79.0 |
| Length L2 (mm) | 8.0 | 8.0 | 8.0 | 8.0 |
| Pitch P1 (mm) | 30.0 | 45.0 | 60.0 | 80.0 |
| Pitch P2 (mm) | 8.5 | 8.5 | 8.5 | 8.5 |
| Depth De (mm) | 2.0 | 2.0 | 2.0 | 2.0 |
| Angle α (deg.) | 0 | 0 | 0 | 0 |
| Radius R1 (mm) | — | — | — | — |
| Radius R2 (mm) | — | — | — | — |

TABLE 17-continued

Results of Experiment 11

|  | Example 42 | Example 43 | Example 44 | Example 45 |
|---|---|---|---|---|
| Area occupation ratio (%) | 91 | 92 | 93 | 93 |
| Weight (g)* | 38 | 33 | 31 | 30 |
| Distance (index) | 136 | 134 | 132 | 130 |

*Difference from Comparative Example 1

Experiment 12

Examples 46 to 48 and Comparative Examples 9 and 10

Tires of Examples 46 to 48 and Comparative Examples 9 and 10 were obtained in the same manner as Example 1, except the lengths L1 and L2 of each dimple and the pitches P1 and P2 between the dimples were as shown in Table 18.

[Weight]
In the same manner as Experiment 1, a difference in weight was calculated. The results are shown in Table 18 below.

[Running Distance]
A running distance was measured by the same method as that in Experiment 1. The results are shown as indexes in Table 18 below.

[Appearance]
The side surfaces of each tire were observed, and the evaluation was categorized based on the following criteria. The results are shown in Table 18 below.
A: Favorable
B: Slightly unfavorable
C: Unfavorable

TABLE 18

Results of Experiment 12

|  | Comp. Ex. 9 | Ex. 46 | Ex. 47 | Ex. 48 | Comp. Ex. 10 |
|---|---|---|---|---|---|
| Contours of Dimples | Rectangle | Rectangle | Rectangle | Rectangle | Rectangle |
| Arrangement | Zigzag | Zigzag | Zigzag | Zigzag | Zigzag |
| Number of rows | 2 | 2 | 2 | 2 | 2 |
| Length L1 (mm) | 3.0 | 9.0 | 16.0 | 29.0 | 49.0 |
| Length L2 (mm) | 1.5 | 4.5 | 8.0 | 14.5 | 24.5 |
| Pitch P1 (mm) | 4.0 | 10.0 | 17.0 | 30.0 | 50.0 |
| Pitch P2 (mm) | 2.0 | 5.0 | 8.5 | 15.0 | 25.0 |
| Depth De (mm) | 2.0 | 2.0 | 2.0 | 2.0 | 2.0 |
| Angle α (deg.) | 0 | 0 | 0 | 0 | 0 |
| Radius R1 (mm) | — | — | — | — | — |
| Radius R2 (mm) | — | — | — | — | — |
| Area occupation ratio (%) | 56 | 81 | 89 | 93 | 96 |
| Weight of tire (g)* | 15 | 16 | 16 | 16 | 17 |
| Running distance (index) | 110 | 125 | 130 | 135 | 135 |
| Appearance | B | A | A | B | C |

*Difference from Comparative Example 1

Experiment 13

Examples 49 to 58

Tires of Examples 49 to 58 were obtained in the same manner as Example 1, except the positions of the dimples were as shown in Tables 19 and 20 below.

[Weight]
In the same manner as Experiment 1, a difference in weight was calculated. The results are shown in Tables 19 and 20 below.

[Running Distance]
A running distance was measured by the same method as that in Experiment 1. The results are shown as indexes in Tables 19 and 20 below.

[Measurement of Temperature]
Each tire was mounted on a normal rim and inflated such that the internal pressure thereof became 220 kPa. A valve core of the tire was removed to cause the inside of the tire to communicate with the atmosphere. The tire was run on a drum at a speed of 80 km/h with a load of 5.2 kN applied to the tire. The running was stopped at the time when the running distance reached 160 km, and the temperature was measured at points P1 to P4 (see FIG. 5) by thermography. The results are shown in Tables 19 and 20 below. A lower value indicates a better result.

TABLE 19

Results of Experiment 13

|  | Ex. 49 | Ex. 50 | Ex. 51 | Ex. 52 | Ex. 53 | Ex. 54 |
|---|---|---|---|---|---|---|
| Contours of Dimples | Rectangle | Rectangle | Rectangle | Rectangle | Rectangle | Rectangle |
| Arrangement | Zigzag | Zigzag | Zigzag | Zigzag | Zigzag | Zigzag |
| Number of rows | 1 | 1 | 1 | 1 | 1 | 1 |
| Position A | Presence | None | None | None | None | None |
| Position B | None | Presence | None | None | None | None |
| Position C | None | None | Presence | None | None | None |
| Position D | None | None | None | Presence | None | None |
| Position E | None | None | None | None | Presence | None |
| Position F | None | None | None | None | None | Presence |
| Length L1 (mm) | 16.0 | 16.0 | 16.0 | 16.0 | 16.0 | 16.0 |
| Length L2 (mm) | 8.0 | 8.0 | 8.0 | 8.0 | 8.0 | 8.0 |
| Pitch P1 (mm) | 17.0 | 17.0 | 17.0 | 17.0 | 17.0 | 17.0 |

TABLE 19-continued

Results of Experiment 13

|  |  | Ex. 49 | Ex. 50 | Ex. 51 | Ex. 52 | Ex. 53 | Ex. 54 |
|---|---|---|---|---|---|---|---|
| Pitch P2 (mm) |  | 8.5 | 8.5 | 8.5 | 8.5 | 8.5 | 8.5 |
| Depth De (mm) |  | 2.0 | 2.0 | 2.0 | 2.0 | 2.0 | 2.0 |
| Angle α (deg.) |  | 0 | 0 | 0 | 0 | 0 | 0 |
| Radius R1 (mm) |  | — | — | — | — | — | — |
| Radius R2 (mm) |  | — | — | — | — | — | — |
| Occupation (%) |  | 89 | 89 | 89 | 89 | 89 | 89 |
| Weight (g)* |  | 8 | 8 | 8 | 8 | 8 | 8 |
| Distance |  | 115 | 110 | 110 | 110 | 115 | 125 |
| Tem- | P1 | 75 | 80 | 80 | 80 | 79 | 80 |
| per- | P2 | 90 | 90 | 90 | 90 | 89 | 90 |
| ature | P3 | 105 | 105 | 105 | 105 | 98 | 101 |
| (° C.) | P4 | 125 | 125 | 125 | 125 | 124 | 115 |

*Difference from Comparative Example 1

TABLE 20

Results of Experiment 13

|  |  | Ex. 55 | Ex. 56 | Ex. 57 | Ex. 58 | Ex. 1 |
|---|---|---|---|---|---|---|
| Contours of Dimples |  | Rectangle | Rectangle | Rectangle | Rectangle | Rectangle |
| Arrangement |  | Zigzag | Zigzag | Zigzag | Zigzag | Zigzag |
| Number of rows |  | 2 | 3 | 4 | 5 | 6 |
| Position A |  | Presence | Presence | Presence | Presence | Presence |
| Position B |  | Presence | Presence | Presence | Presence | Presence |
| Position C |  | None | Presence | Presence | Presence | Presence |
| Position D |  | None | None | Presence | Presence | Presence |
| Position E |  | None | None | None | Presence | Presence |
| Position F |  | None | None | None | None | Presence |
| Length L1 (mm) |  | 16.0 | 16.0 | 16.0 | 16.0 | 16.0 |
| Length L2 (mm) |  | 8.0 | 8.0 | 8.0 | 8.0 | 8.0 |
| Pitch P1 (mm) |  | 17.0 | 17.0 | 17.0 | 17.0 | 17.0 |
| Pitch P2 (mm) |  | 8.5 | 8.5 | 8.5 | 8.5 | 8.5 |
| Depth De (mm) |  | 2.0 | 2.0 | 2.0 | 2.0 | 2.0 |
| Angle α (deg.) |  | 0 | 0 | 0 | 0 | 0 |
| Radius R1 (mm) |  | — | — | — | — | — |
| Radius R2 (mm) |  | — | — | — | — | — |
| Occupation (%) |  | 89 | 89 | 89 | 89 | 89 |
| Weight (g)* |  | 16 | 24 | 32 | 40 | 48 |
| Distance |  | 120 | 125 | 140 | 145 | 160 |
| Tem- | P1 | 75 | 75 | 70 | 70 | 70 |
| per- | P2 | 88 | 85 | 80 | 80 | 80 |
| ature | P3 | 105 | 105 | 100 | 95 | 95 |
| (° C.) | P4 | 125 | 125 | 125 | 120 | 115 |

*Difference from Comparative Example 1

As shown in Tables 1 to 20, the tire of each Example is excellent in various performance characteristics. From the results of evaluation, advantages of the present invention are clear.

INDUSTRIAL APPLICABILITY

The pneumatic tire according to the present invention can be mounted on various vehicles.

DESCRIPTION OF THE REFERENCE CHARACTERS

2 . . . tire
4 . . . tread
8 . . . sidewall
10 . . . clinch portion
12 . . . bead
14 . . . carcass
16 . . . support layer
18 . . . belt
20 . . . band
62, 74, 82, 84, 86, 92 . . . dimple
64, 72, 80 . . . land

The invention claimed is:

1. A pneumatic tire comprising, on side surfaces thereof, a large number of dimples arranged along a circumferential direction in two or more rows and a land portion which is disposed in an area other than the area occupied by the dimples, wherein
    each dimple contour has a length in the circumferential direction that is larger than the length in the radial direction such that the dimple is substantially a quadrilateral,
    an area occupation ratio of each dimple is equal to or greater than 75% but equal to or less than 93%,
    dimples of a first row are aligned along the circumferential direction, and dimples of a second row are aligned along the circumferential direction adjacent to the dimples of the first row,
    the dimples of the first row and the second row are arranged in a zigzag manner, and
    the dimples of the first and second rows are disposed such that a first circumferential edge of each first row dimple is offset by a distance in the circumferential direction equal to or greater than 3.0 mm with respect to a corresponding first circumferential edge of an adjacent dimple in the second row.

2. The tire according to claim 1, wherein the contour of each dimple is symmetrical about a straight line extending in the radial direction.

3. The tire according to claim 1, wherein a depth of each dimple is equal to or greater than 0.5 mm but equal to or less than 4.0 mm.

4. The tire according to claim 1, wherein
each corner of the quadrilateral is rounded, and
a curvature radius R2 of the rounded corner is equal to or greater than 0.5 mm but equal to or less than 3.0 mm.

5. The tire according to claim 1, wherein
the contour of each dimple is substantially a parallelogram,
each long side of the parallelogram extends in the circumferential direction, and
an angle of each short side of the parallelogram relative to the radial direction is equal to or less than 20°.

6. The tire according to claim 1, wherein
each dimple has a side surface connected to the land portion and a bottom surface connected to the side surface,
a corner between the side surface and the bottom surface is rounded, and
a curvature radius R1 of the rounded corner is equal to or greater than 0.5 mm but equal to or less than 2.0 mm.

7. The tire according to claim 1, wherein
each dimple has a side surface connected to the land portion and a bottom surface connected to the side surface, and
the side surface is a slope tilted relative to a depth direction of the dimple.

8. The tire according to claim 1, wherein
the land portion between each dimple and another dimple circumferentially adjacent to that dimple has a width that is equal to or greater than 0.3 mm but equal to or less than 3.0 mm.

9. The tire according to claim 1, wherein each dimple has a bottom surface, and the bottom surface has a plurality of ridges.

10. The tire according to claim 1, wherein a pitch in the circumferential direction between the dimples in each row is equal to or greater than 5 mm but equal to or less than 60 mm.

11. The tire according to claim 1, wherein a pitch in the radial direction between the dimples in the first and second rows is equal to or greater than 2 mm but equal to or less than 40 mm.

12. The tire according to claim 1, further comprising:
a tread having an outer surface which forms a tread surface;
a pair of sidewalls extending from ends, respectively, of the tread substantially inward in the radial direction;
a pair of beads located substantially inward of the sidewalls, respectively, in the radial direction;
a carcass extending along the tread and the sidewalls and on and between the beads; and
a pair of load support layers located inward of the sidewalls, respectively, in the axial direction.

13. The tire according to claim 12, wherein
each bead includes a core and an apex extending from the core outward in the radial direction, and
in the radial direction, positions of the dimples coincide with a position of an outer end, in the radial direction, of the apex.

14. The tire according to claim 12, wherein, in the radial direction, positions of the dimples coincide with a position where a thickness of each load support layer is at its maximum.

15. The tire according to claim 12, further comprising a pair of clinch portions located substantially inward of the sidewalls in the radial direction, wherein in the radial direction, positions of the dimples coincide with a position of an outer end, in the radial direction, of each clinch portion.

16. The tire according to claim 12, wherein, in the radial direction, positions of the dimples coincide with a position of a portion of each sidewall where a curvature radius of the sidewall is the smallest during running in a punctured state.

17. The tire according to claim 12, wherein a thermal conductivity of each sidewall is equal to or greater than 0.1 W/m/K.

18. The tire according to claim 12, wherein a thermal conductivity of each load support layer is equal to or greater than 0.2 W/m/K.

* * * * *